United States Patent
Natori et al.

(10) Patent No.: US 6,684,383 B1
(45) Date of Patent: Jan. 27, 2004

(54) METHOD FOR CONSTRUCTING ENTERPRISE SYSTEM

(75) Inventors: Mari Natori, Tama (JP); Hiroshi Okano, Urawa (JP); Seiichiro Tanaka, Koshigaya (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 559 days.

(21) Appl. No.: 09/662,592

(22) Filed: Sep. 14, 2000

(30) Foreign Application Priority Data

Sep. 29, 1999 (JP) .............................. 11-277509

(51) Int. Cl.$^7$ ............................................... G06F 9/44
(52) U.S. Cl. ....................................... 717/107; 717/116
(58) Field of Search ................................ 717/106–122, 717/100, 101

(56) References Cited

U.S. PATENT DOCUMENTS

| | | | | |
|---|---|---|---|---|
| 6,199,197 B1 | * | 3/2001 | Engstrom et al. | 717/100 |
| 6,298,476 B1 | * | 10/2001 | Misheski et al. | 717/101 |
| 6,308,314 B1 | * | 10/2001 | Carlson et al. | 717/104 |
| 6,405,360 B1 | * | 6/2002 | Bohrer et al. | 717/108 |
| 6,434,739 B1 | * | 8/2002 | Branson et al. | 717/108 |
| 6,502,234 B1 | * | 12/2002 | Gauthier et al. | 717/107 |

OTHER PUBLICATIONS

Shagram. Software Re–engineering using Hierarchical–Client–Server Paradigm (HCS) & BUBBLES. IEEE. 1991. pp. 50–56.*
Yang et al. An Object–Oriented Architecture Supporting Web Application Testing. IEEE. 1999. pp. 122–127.*
Sung et al. A Multimedia Authoring Tool for the Internet. IEEE. 1997. pp. 304–308.*
Sechrest et al. Blending Hierarchical and Attribute–Based File Naming. IEEE. 1992. pp. 572–580.*
Copy of U.S. patent application Ser. No. 09/262,743, filed Mar. 5, 1999, to Natori et al.
Copy of U.S. patent application Ser. No. 09/008,218, filed Jan. 16, 1998, to Yoshida et al.
M. Natori et al., "A Framework for Constructing Business Application Software", Pre–Addendum OOPSLA '98, Oct. 18, 1998.
M. Natori et al., "How to Achieve Framework–Centric Software Construction for Business Applications", Object World '99, Berlin, May 1999.

* cited by examiner

*Primary Examiner*—Wei Zhen
(74) *Attorney, Agent, or Firm*—Finnegan, Henderson, Farabow, Garrett & Dunner, L.L.P.

(57) ABSTRACT

There is provided an enterprise system constructing method capable of supporting to rapidly construct enterprise systems to share and reuse the whole structure of the systems, and of flexibly and easily changing and extending the systems.

A framework 10 includes: a framework 11 which defines the basic attribute and behavior of an enterprise system; frameworks 12, 13 and 14 which inherit the framework 11 and which define the basic attribute and behavior suitable for various executable environments; and a framework for integrating systems 15 which inherits the framework 11 and which defines the basic attribute and behavior relating to combinations of the frameworks 12, 13 and 14. Each of the frameworks 11, 12, 13, 14 and 15 is inherited and materialized, and systems prepared from the frameworks 12, 13 and 14 are combined so as to have a tree structure, the vertex of which is an integrating system prepared from the frameworks for integrating systems 15.

11 Claims, 23 Drawing Sheets

METHOD FOR CONSTRUCTING ENTERPRISE SYSTEM

BACKGROUND OF THE INVENTION

1. Field of the Invention

The present invention relates generally to a method for constructing an enterprise application system (which will be hereinafter simply referred to as an "enterprise system"). More specifically, the invention relates to a method for constructing an enterprise system using a framework which is described by an object-oriented language; a computer readable recording medium in which an enterprise system framework has been recorded; a system for supporting the construction of an enterprise system; and a computer readable recording medium in which a program for supporting the construction of an enterprise system has been recorded.

2. Description of the Prior Art

In recent years, as systems for integrally processing a wide variety of businesses in business enterprises, enterprise systems are widely noticed. The enterprise system is a system for integrally supporting activities on the whole business enterprise by cooperatively operating a plurality of application programs which realize various businesses and which are arranged on a computer system.

By the way, such an enterprise system is generally realized by a large-scale computer system including a plurality of hardware elements, such as clients, a server, a database and a mainframe, and also executed on an environment, such as Internet or an intranet, in addition to the existing client/Server environment (a stand-alone client/server environment), in accordance with the kind of application programs and so forth.

Therefore, when such an enterprise system is conventionally developed, an application program based on the existing client/server environment (a client/server application system) and an application program based on an environment, such as Internet or an intranet (an Web application system), are independently developed.

As described above, conventionally, application programs serving as objects to be integrated are independently developed every executable environment.

However, in such a conventional development method, even a basic structure of an enterprise system common to application programs is individually developed every application program. In addition, a program for integrating the application programs must be constructed from the beginning. Therefore, there are problems in that it is not possible to share and reuse the whole structure of the system and it is not possible to flexibly and easily change and extend the enterprise system in accordance with specification change and function extension.

SUMMARY OF THE INVENTION

It is therefore an object of the present invention to eliminate the aforementioned problems and to provide an enterprise system constructing method; a computer readable recording medium, in which an enterprise system framework has been recorded; a system for supporting the construction of an enterprise system; and a computer readable recording medium, in which a program for supporting the construction of an enterprise system has been recorded, which are capable of supporting to rapidly construct enterprise systems to integrate the basic structures of the enterprise systems to share and reuse the whole structure of the systems, and of flexibly and easily changing and extending the enterprise systems.

In order to accomplish the aforementioned and other objects, according to a first aspect of the present invention, there is provided an enterprise system constructing method for constructing an enterprise system using a framework which is described by an object-oriented language, the enterprise system constructing method comprising the steps of: preparing an enterprise system framework, which include (a) an enterprise system basic framework which defines a basic attribute and behavior of an enterprise system, (b) a client/server application system framework, an Web application system framework and a server application system framework, which inherit the enterprise system basic framework and which define a basic attribute and behavior of a stand-alone client/server application system, a network-oriented client/server application system and a server-oriented server application system, respectively, and (c) a framework for integrating systems, which inherits the enterprise system basic framework and which defines a basic attribute and behavior of a combination of the client/server application system framework, the Web application system framework and the server application system framework; inheriting the client/server application system framework, the Web application system framework and the server application system framework of the enterprise system framework, respectively, to prepare a client/server application system, an Web application system and a server application system; inheriting the framework for integrating systems of the enterprise system framework to prepare an integrating system; inheriting the enterprise system basic framework of the enterprise system framework to prepare a main system; utilizing the integrating system to construct a hierarchical possessive relationship between the client/server application system, the Web application system and the server application system; and integrating the client/server application system, the web application system, the server application system, the integrating system and the main system.

In the above described enterprise system constructing method according to the first aspect of the present invention, the hierarchical possessive relationship between the client/server application system, the Web application system and the server application system is preferably constructed as a tree structure, the vertex of which is the integrating system.

According to a second aspect of the present invention, there is provided a computer readable recording medium, in which an enterprise system framework described by an object-oriented language is recorded, the enterprise system framework comprises: an enterprise system basic framework which defines a basic attribute and behavior of an enterprise system; a client/server application system framework which inherits the enterprise system basic framework and which defines a basic attribute and behavior of a stand-alone client/server application system; an Web application system framework which inherits the enterprise system basic framework and which defines a basic attribute and behavior of a network-oriented client/server application system; and a server application system framework which inherits the enterprise system basic framework and which defines a basic attribute and behavior of a server-oriented :server application system.

Preferably, the above described Computer readable recording medium according to the second aspect of the present invention further comprises a framework for integrating systems, which inherits the enterprise system basic framework and which defines a basic attribute and behavior of a combination of the client/server application system framework, the web application system framework and the server application system framework. In addition, the framework for integrating systems is preferably formed so that a hierarchical possessive relationship between the client/server application system, the Web application system and the server application system, which inherit the client/server application system framework, the Web application framework and the server application system framework, respectively, is constructed as a tree structure, the vertex of which is an integrating system inheriting the framework for integrating systems.

According to a third aspect of the present invention, there is provided a computer readable recording medium, in which an enterprise system framework including a group of frameworks, which are described by an object-oriented language and which are capable of delivering data between systems generated by each of frameworks, is recorded, the enterprise system framework including; an enterprise system basic framework which defines a delivery of data between systems; and a group of frameworks for various executable environments, which inherit the enterprise system basic framework.

According to a fourth aspect of the present invention, there is provided a computer readable recording medium, in which an enterprise system framework including a group of frameworks, which are described by an object-oriented language and which are capable of transmitting and acquiring data between systems generated by each of frameworks, is recorded, the enterprise system framework comprising: an enterprise system basic framework which defines a transmission and acquisition of data between systems; and a group of frameworks for various executable environments, which inherit the enterprise system basic framework.

According to a fifth aspect of the present invention, there is provided a computer readable recording medium, in which an enterprise system framework including a group of frameworks, which are described by an object-oriented language and which are capable of constructing a hierarchical possessive relationship between systems generated by each of frameworks, is recorded, the enterprise system framework comprising: an enterprise system basic framework which defines a basic attribute and behavior of an enterprise system; a group of frameworks for various executable environments, which inherit the enterprise system basic framework; and a framework for integrating systems, which inherits the enterprise system basic framework and which defines a basic attribute and behavior of a combination of the group of frameworks for various executable environments.

In the above described computer readable recording medium according to the fifth aspect of the present invention, the framework for integrating systems is preferably formed so that a hierarchical possessive relationship between a group of Systems, which inherit the group of frameworks for various executable environments, is constructed as a tree structure, the vertex of which is an integrating system inheriting the framework for integrating systems.

According to a sixth aspect of the present invention, there is provided a system for supporting the construction of an enterprise system, using a framework which is described by an object-oriented language, the enterprise system framework including (a) an enterprise system basic framework which defines a basic attribute and behavior of an enterprise system, (b) a client/server application system framework, an web application system framework and a server application system framework, which inherit the enterprise system basic framework and which define a basic attribute and behavior of a stand-alone client/server application system, a network-oriented client/server application system and a server-oriented server application system, respectively, and (c) a frame work for integrating systems, which inherits the enterprise system basic framework and which defines a basic attribute and behavior of a combination of the client/server application system framework, the Web application system framework and the server application system framework, said system for supporting the construction of an enterprise system comprising: means for inheriting the client/server application system framework, the Web application system framework, the server application system framework and the framework for integrating systems of the enterprise system framework, respectively, to prepare a client/server application system, an Web application system, a server application system and an integrating system, and for inheriting the enterprise system basic framework of the enterprise system framework to prepare a main system; means for utilizing the prepared integrating system to define a hierarchical possessive relationship between the client/server application system, the Web application system and the server application system; and means for integrating the client/server application system, the Web application system, the server application system, the integrating system and the main system.

Preferably, the above described system for supporting the construction of an enterprise system, according to the sixth aspect of the present invention, further comprises means for carrying out processing, such as retrieval, editing, registration or deletion, with respect to the enterprise system framework.

According to a seventh aspect of the present invention, there is provided a computer readable recording medium, in which s system for supporting the construction of an enterprise system, using a framework which is described by an object-oriented language, is recorded, the computer readable recording medium causing a computer to execute procedures for: preparing an enterprise system framework, which include (a) an enterprise system basic framework which defines a basic attribute and behavior of an enterprise system, (b) a client/server application system framework, an Web application system framework and a server application system framework, which inherit the enterprise system basic framework and which define a basic attribute and behavior of a stand-alone client/server application system, a network-oriented client/server application system and a server-oriented server application system, respectively, and (c) a framework for integrating systems, which inherits the enterprise system basic framework and which defines a basic attribute and behavior of a combination of the client/server application system framework, the Web application system framework and the server application system framework; inheriting the client/server application system framework, the Web application system framework, the server application system framework and the framework for integrating systems of the enterprise system framework, respectively, to prepare a client/server application system, an Web application system, a server application system and an integrating system, and inheriting the enterprise system basic framework to prepare a main system; utilizing the integrating system to define a hierarchical possessive relationship between the client/server application system, the Web application system and the server application system; and integrating the defined client/server application system, Web application system, server application system, integrating system and main system.

According to the present invention, the basic functions of an integrated system, which straddles the basic functions and executable environments of systems, are provided as frameworks (the enterprise system basic framework, the client/server application system framework, the Web application system framework, the server application system framework and the framework for integrating systems) every executable environment relating to an enterprise system, and each of the frameworks is inherited and materialized to construct the enterprise system. Therefore, it is possible to share and reuse the basic structure of an enterprise system (the skeleton of the systems, the behavior and attributes common to the systems and so forth), so that it is possible to easily construct an enterprise system integrating systems (a stand-alone client/server application system, a network-oriented client/server application system and a server-oriented server application system) which are executed in various executable environments.

In addition, according to the present invention, the framework for integrating systems combines a group of systems, which are prepared by inheriting a plurality of sub-frameworks (the client/server application system framework, the Web application system framework and the server application system framework), respectively, by the hierarchical possessive relationship. Therefore, it is possible to easily add, delete and extend a system, so that it is possible to flexibly and easily change and extend an enterprise system in accordance with specification change and function extension.

Moreover, according to the present invention, the basic functions of a system are provided as frameworks every executable environment relating to an enterprise system. Therefore, if developers reuse and share the frameworks, it is possible to rapidly construct an enterprise system.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described below. FIGS. 1 through 11 are drawings for explaining a preferred embodiment of a method for constructing an enterprise system and an enterprise system framework according to the present invention.

[Enterprise System]

First, referring to FIG. 11, a system configuration of an enterprise system constructed in this preferred embodiment will be described below.

Figure 11:
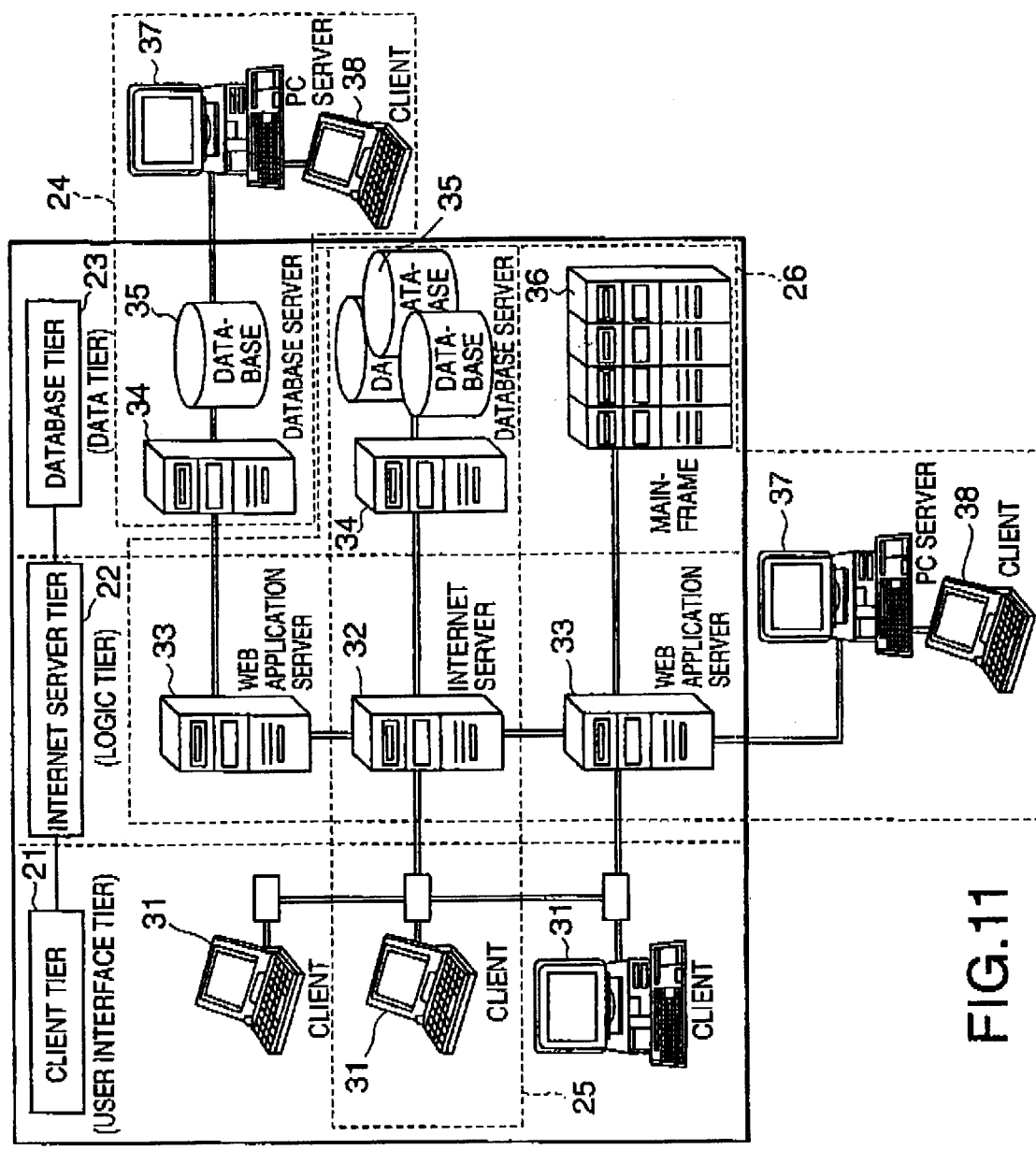
FIG. 11 is an illustration showing an example of a computer system in which an enterprise system is executed.

As shown in FIG. 11, the enterprise system comprises a client tier 21, an Internet server tier 22, and a database tier 23.

The client tier 21 is realized on a plurality of clients 31, and provides a user interface by means of a client program.

The Internet tier 22 is realized on an Internet server 32 and an Web application server 33, and provides logic processing specializing in specific business, type of business and so forth, by means of a program for executing data processing, message processing and so forth on Internet and an intranet. Furthermore, a server 37 and a client 38 may be connected to the web application server 33 as means for inputting/outputting data from/to the outside.

The database tier 23 is realized on a database server 34, a data source 35, such as a database, and a mainframe 36, and provides a data management function by means of a program for executing data processing and so forth. Furthermore, the server 37 and the client 38 may be connected to the database 35 as means for inputting/outputting data from/to the outside.

[Enterprise System Framework]

Figure 1:
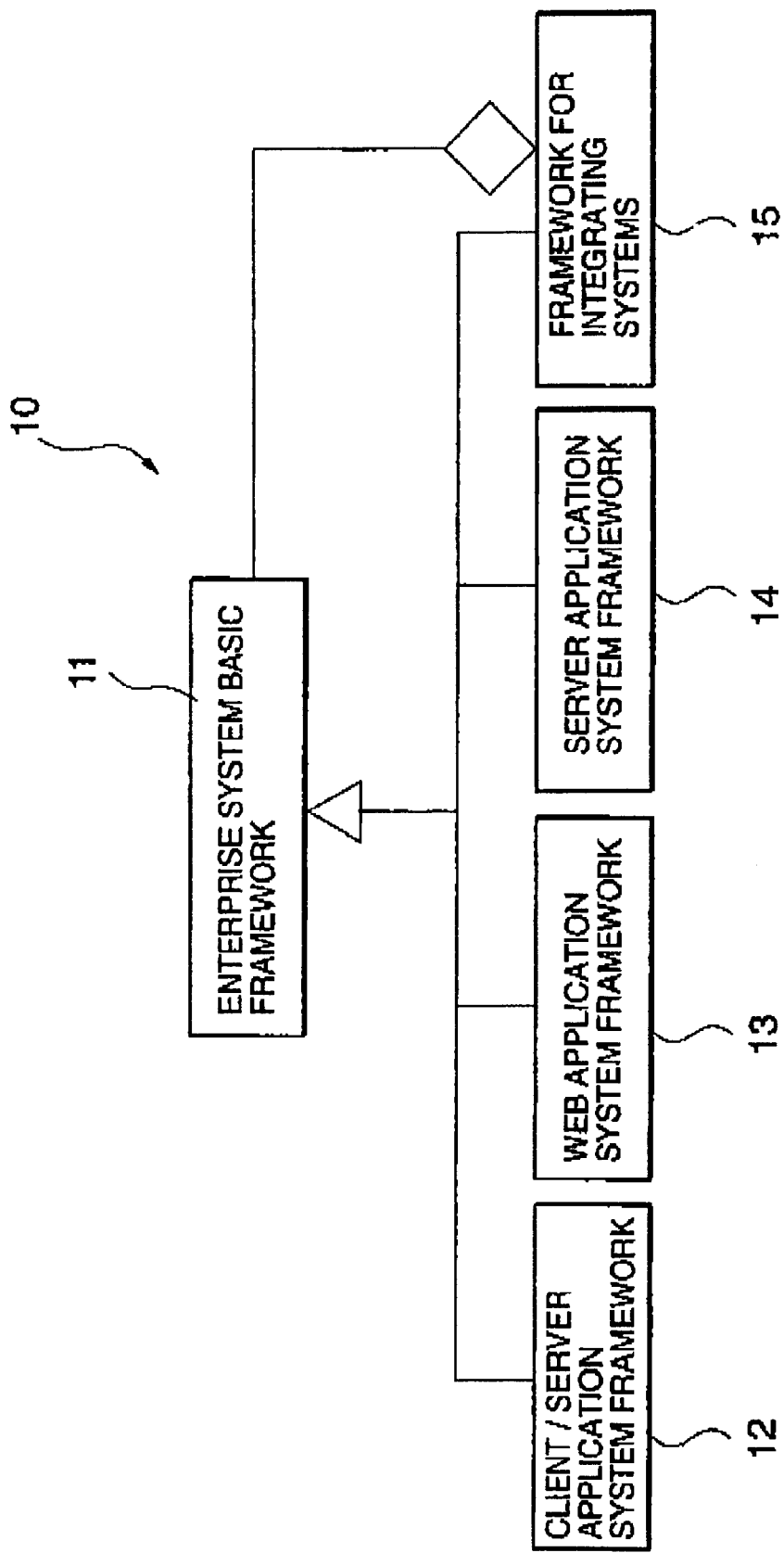
FIG. 1 is a block diagram of an enterprise system framework for use in a preferred embodiment of a method for constructing an enterprise system according to the present invention.

Referring to FIG. 1, an enterprise system framework for use in a method for constructing an enterprise system in this preferred embodiment will be described below. Furthermore, it is assumed that the enterprise system framework is described by an object-oriented language having characteristics of "abstraction" and "inheritance." The term "abstraction" means to generalize a property, which is common to a plurality of objects, to define the common property as a class. The term "inheritance" means that a lower class inherits all properties of an upper class (which are defined as attributes and methods in the class).

As shown in FIG. 1, an enterprise system framework 10 comprises an enterprise system basic framework 11, a client/server application system framework 12, an web application system framework 13, a server application system framework 14, and a framework for integrating systems 15.

The enterprise system basic framework 11 is a software skeleton which abstractly defines basic attributes and behaviors of an enterprise system, and is expressed as an aggregate of abstract classes and concrete classes. Furthermore, the enterprise system basic framework 11 provides basic functions which relate to the start and end of systems, the delivery of data between systems, the transmission and acquisition of requests, the input/output of data to systems, the transition between systems, system control, and connection interfaces to common components (processing components, GUI (Graphical User Interface) components, DB (DataBase) access components, communication processing components, etc.).

The client/server application system framework 12 inherits the enterprise system basic framework 11. The client/server application system framework 12 is a software skeleton which abstractly defines basic attributes and behaviors of an stand-alone client/server application system, and is expressed as an aggregate of abstract classes and concrete classes. Furthermore, the client/server application system framework 12 provides the basic functions of application programs for an executable environment defined by reference number 24 in the system configuration shown in FIG. 11. That is, the client/server application system framework 12 provides basic functions which relate to the start and end of systems, the delivery of data between systems, the transmission and acquisition of requests, the input/output of data to systems, the transition between systems, system control, and connection interfaces to common components, in a system which is realized on the client 38, the server 37, the database server 34 and the data source 35 such as database, which are previously supposed.

The Web application system framework 13 inherits the enterprise system basic framework 11. The Web application system framework 13 is a software skeleton which abstractly defines basic attributes and behaviors of a network-oriented client/server application system, and is expressed as an aggregate of abstract classes and concrete classes. Furthermore, the Web application system framework 13 provides the basic functions of application programs for an executable environment defined by reference number 25 in the system configuration shown in FIG. 11. That is, the Web application system framework 13 provides basic functions which relate to the start and end of systems, the delivery of data between systems, the transmission and acquisition of requests, the input/output of data to systems, the transition between systems, system control, and connection interfaces to common components, in a system which is realized on many and unspecified clients 31, the database server 34 and data source 35, such as database, which are previously supposed, and the Internet server 32 which is previously supposed.

The server application system framework 14 inherits the enterprise system basic framework 11. The server application system framework 14 is a software skeleton which abstractly defines basic attributes and behaviors of an enterprise-server-oriented client application system, and is expressed as an aggregate of abstract classes and concrete classes. Furthermore, the server application system framework 14 provides the basic functions of application programs for an executable environment defined by reference number 26 in the system configuration shown in FIG. 11. That is, the server application system framework 14 provides basic functions which relate to the start and end of systems, the delivery of data between systems, the transmission and acquisition of requests, the input/output of data to systems, the transition between systems, system control, and connection interfaces to common components, in a system which is realized on many and unspecified Web application servers 33, the database server 34 and data source 35, such as database, in which addition, deletion, extension and so forth are previously supposed, and the Internet server 32 which is previously supposed.

The Framework for integrating systems 15 inherits the enterprise system basic framework 11. The Framework for integrating systems 15 is a software skeleton which abstractly 35 defines basic attributes and behaviors of combinations of the client/server application system framework 12, the Web application system framework 13 and the server application system frame work 14, and is expressed as an aggregate of abstract classes and concrete classes. Furthermore, the Framework for integrating systems 15 is capable of constructing a hierarchical possessive relationship between systems (a client/server application system, an Web application system and a server application system) which inherit the client/server application system framework 12, the Web application system framework 13 and the server application system framework 14, respectively, as a tree structure, the vertex (including the meaning of the vertex of a sub-tree) of which is an integrating system inheriting the framework for integrating systems 15. The expression "hierarchical possessive relationship between systems" means the relationship between systems wherein system B having system A as a parent system has system C as a child system of system C so that system C exists a grandchild system of system A.

[Own Coding Part]

Furthermore, the frameworks for use in this preferred embodiment provide a software skeleton relating to a own coding part of an application program.

Figure 23:
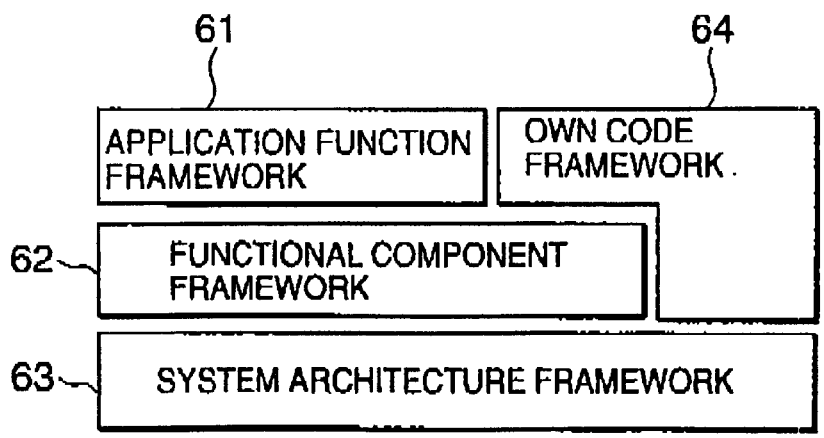
FIG. 23 is an illustration for explaining the category of frameworks.

Referring to FIG. 23, an own coding part of an application program will be described below.

As shown in FIG. 23, frameworks are generally classified into an application function framework 61, a functional component framework 62 and a system architecture framework 63. The application function framework 61 provides a software skeleton for preparing an application program specializing in specific business, type of business and so forth, and corresponds to, e.g., a framework for order and inventory management. The functional component framework 62 provides a software skeleton for preparing the common functions of systems independent of business, type of business and so forth, and corresponds to, e.g., a framework for GUI and transaction processing. The system architecture framework 63 provides a software skeleton for providing the architecture of a system, and corresponds to, e.g., a framework for a container for providing the behavior of components and a solution system for constructing an web application program.

However, when an application program is actually constructed, even if the application function framework 61, the functional component framework 62 and the system architecture framework 63 are used, a development portion (an own code) for customizing and integrating the frameworks is always existed.

The framework for use in this preferred embodiment is a framework (an own code framework 64) for providing development rules and basic functions in accordance with such an own code, and provides a software skeleton straddling both of the regions of the application function framework 61 and functional component framework 62 as shown in FIG. 23.

[Method for Constructing Enterprise System]

Figure 2:
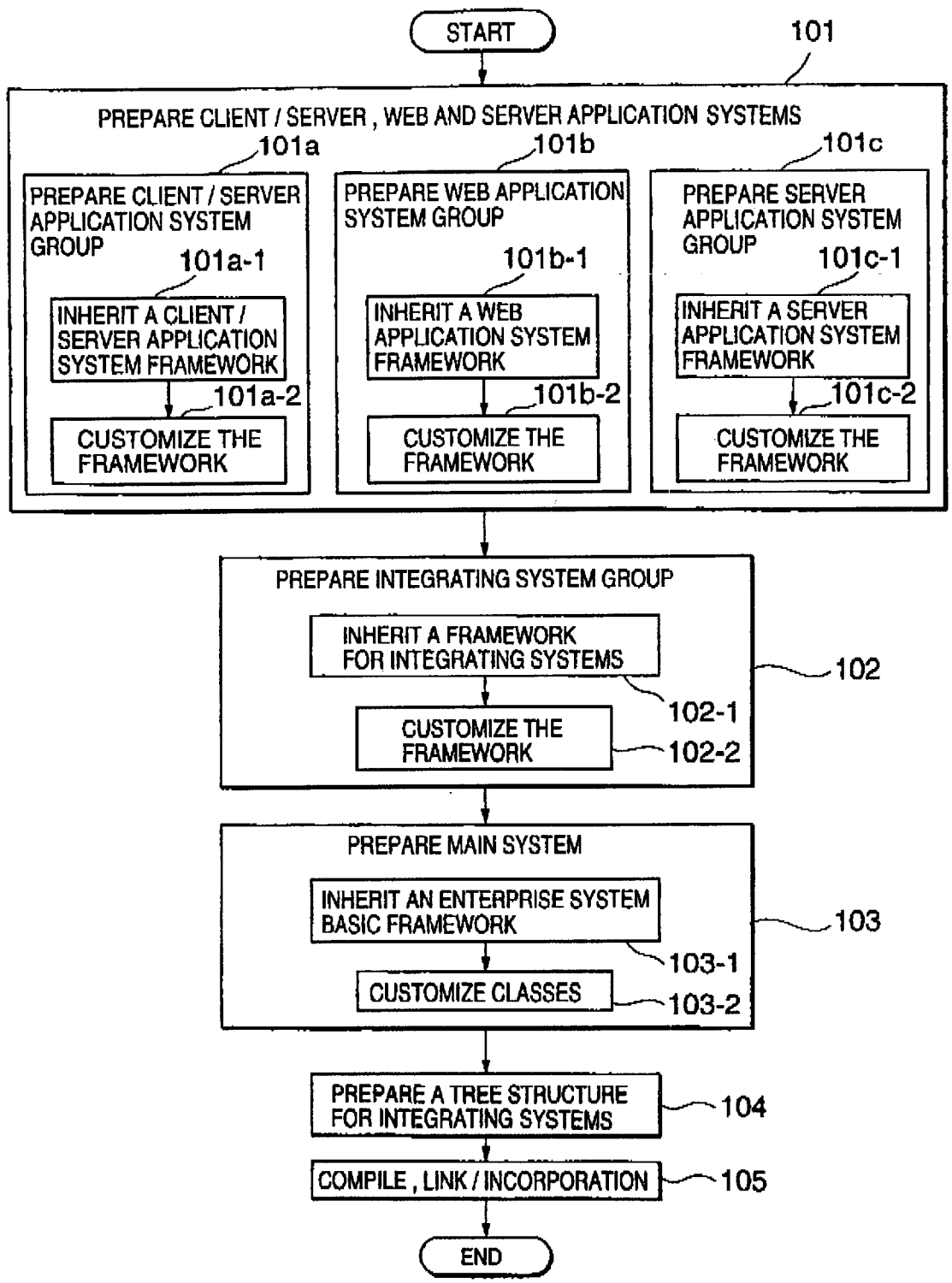
FIG. 2 is a flow chart for explaining a preferred embodiment of a method for constructing an enterprise system according to the present invention.
Figure 3:
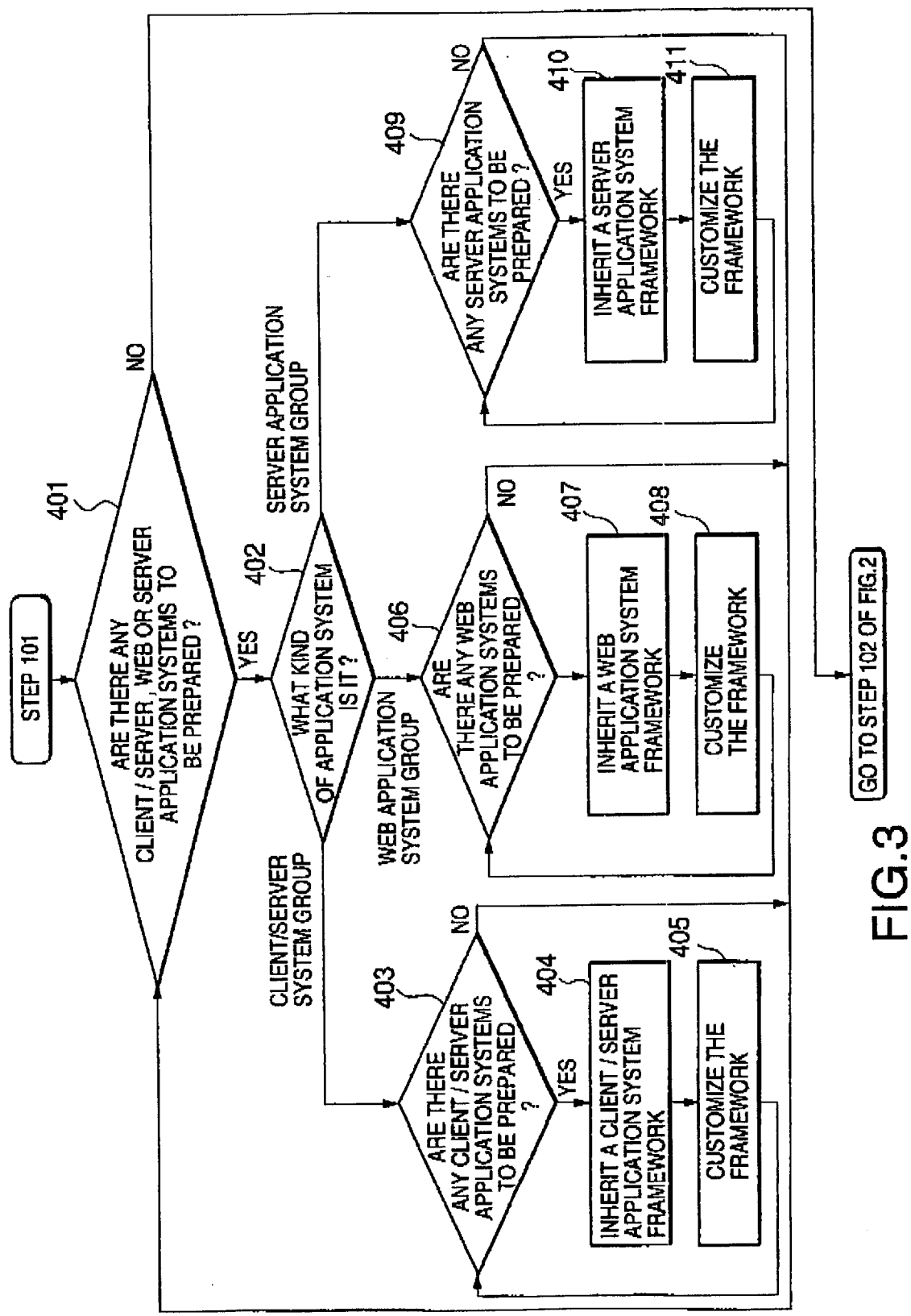
FIG. 3 is a flow chart for explaining the details of step 101 of FIG. 2.
Figure 4:
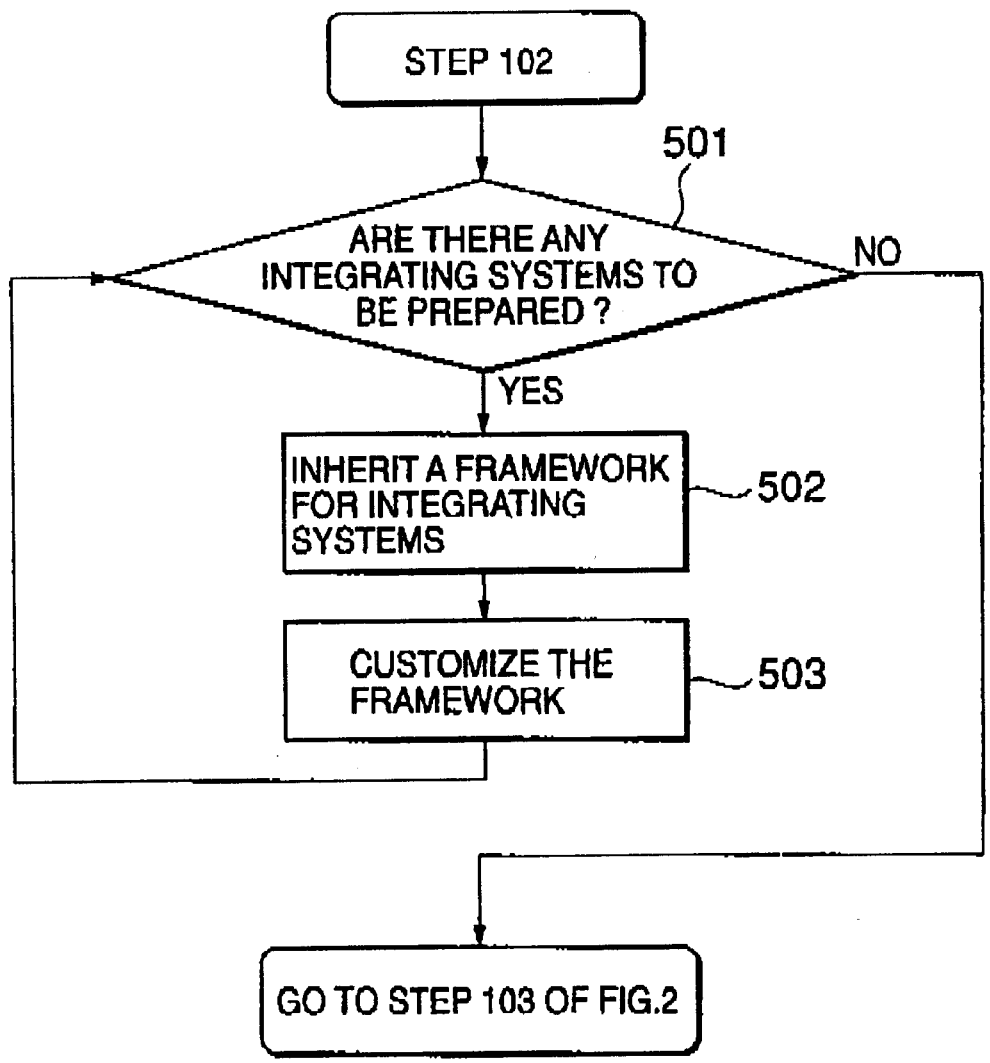
FIG. 4 is a flow chart for explaining the details of step 102 of FIG. 2.
Figure 5:
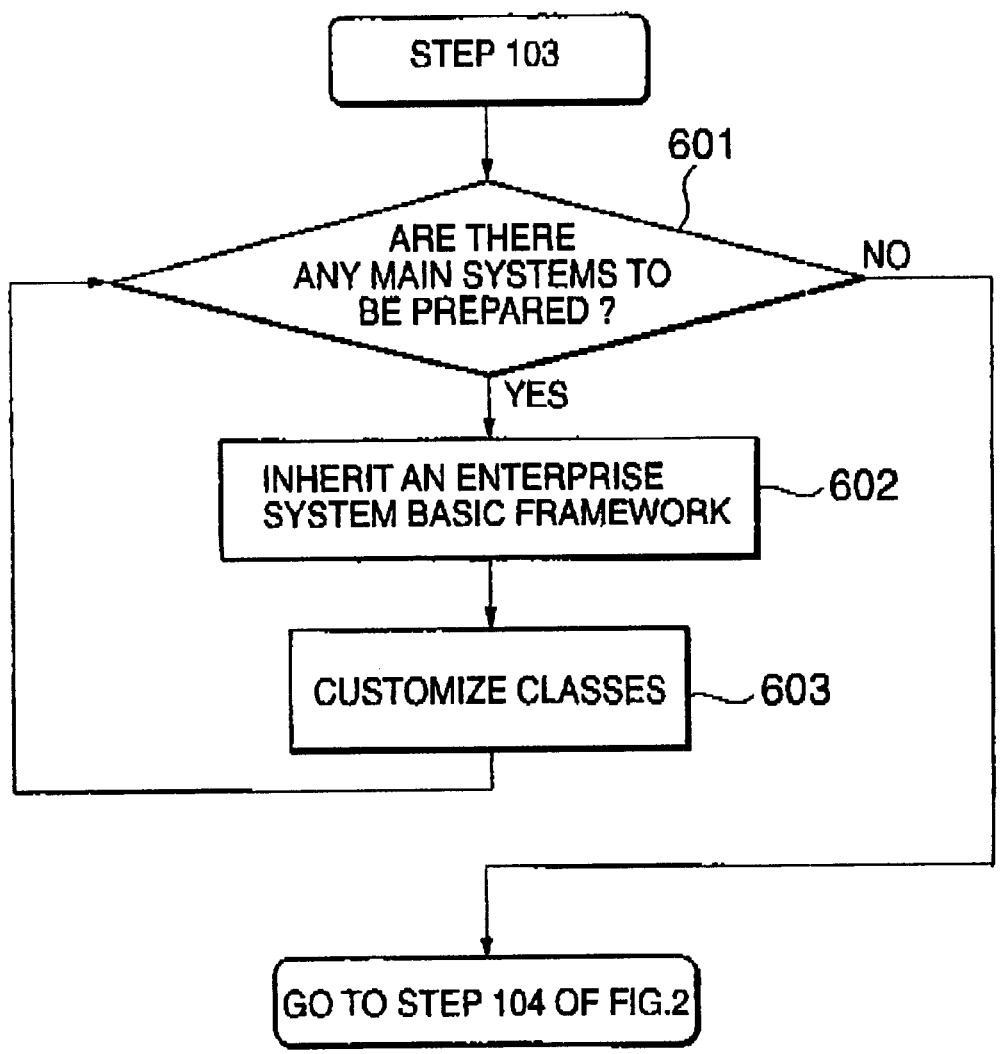
FIG. 5 is a flow chart for explaining the details of step 103 of FIG. 2.

Referring to FIG. 1 and FIGS. 2 through 6, a method for constructing an enterprise system using such an enterprise system framework 10 will be described below. FIG. 2 is a flow chart for explaining a preferred embodiment of a method for constructing an enterprise system according to the present invention, and FIGS. 3 through 5 are flow charts for explaining the details of steps 101, 102 and 103 of FIG. 2, respectively. Furthermore, it is herein assumed that the enterprise system framework shown in FIG. 1 has been previously prepared.

First, the client/server application framework 12, Web application framework 13 and server application framework 14 of the enterprise system framework 10 shown in FIG. 1 are inherited to prepare a client/server application system group, an Web application system group and a server application system group (step 101).

Specifically, at step 101a, an abstract class included in the client/server application system framework 12 is inherited to prepare a subclass (step 101a-1), and the prepared subclass is customized by materializing the abstract method of the subclass and/or by adding a new attribute or method thereto (step 101a-2), so that the client/server application system group is prepared. In addition, at step 101b, an abstract class included in the Web application system framework 13 is inherited to prepare a subclass (step 101b-1), and the prepared subclass is customized by materializing the abstract method of the subclass and/or by adding a new attribute or method thereto (step 101b-2), so that the Web application system group is prepared. Moreover, at step 101c, an abstract class included in the server application system framework 14 is inherited to prepare a subclass (step 101c-1), and the prepared subclass is customized by materializing the abstract method of the subclass and/or by adding a new attribute or method thereto (step 101c-2), so that the server application system group is prepared. Furthermore, the order of steps 101a, 101b and 101c is optionally determined, so that the client/server application system group, the Web application system group and the server application system group may be prepared in any order.

FIG. 3 is a flow chart for explaining the details of step 101 of FIG. 2. As shown in FIG. 3, at step 101, it is first determined whether there are any client/server, Web and server application system groups to be prepared (step 401). If there are any application system groups to be prepared, the kind of the application system groups is determined (step 402). Then, the inheritance and customizing of frameworks are repeated by the number of required systems, with respect to each of the client/server application system group, the Web application system group and the server application system group (steps 403 through 411).

Then, the framework for integrating systems 15 of the enterprise system framework 10 is inherited to prepare an integrating system group (step 102).

Specifically, an abstract class included in the framework for integrating systems 15 is inherited to prepare a subclass (step 102-1), and the prepared subclass is customized by materializing the abstract method of the subclass and/or by adding a new attribute or method thereto (step 102-2), so that the integrating system group is prepared.

FIG. 4 is a flow chart for explaining the details of step 102 of FIG. 2. As shown in FIG. 4, at step 102, it is determined whether there are any integrating systems to be prepared, and the inheritance and customizing of frameworks are repeated by the number of required systems (steps 501 through 503).

Then, the enterprise system basic framework 11 of the enterprise system framework 10 is inherited to prepare a main system (step 103).

Specifically, an abstract class included in the enterprise system basic framework 11 is inherited to prepare a subclass (step 103-1), and the prepared subclass is customized by materializing the abstract method of the subclass and/or by adding a new attribute or method thereto (step 103-2), so that the main system is prepared.

FIG. 5 is a flow chart for explaining the details of step 103 of FIG. 2. As shown in FIG. 5, at step 103, it is determined whether there are any main systems to be prepared, and the inheritance and customizing of frameworks are repeated by the number of required systems (steps 601 through 603).

Figure 6:
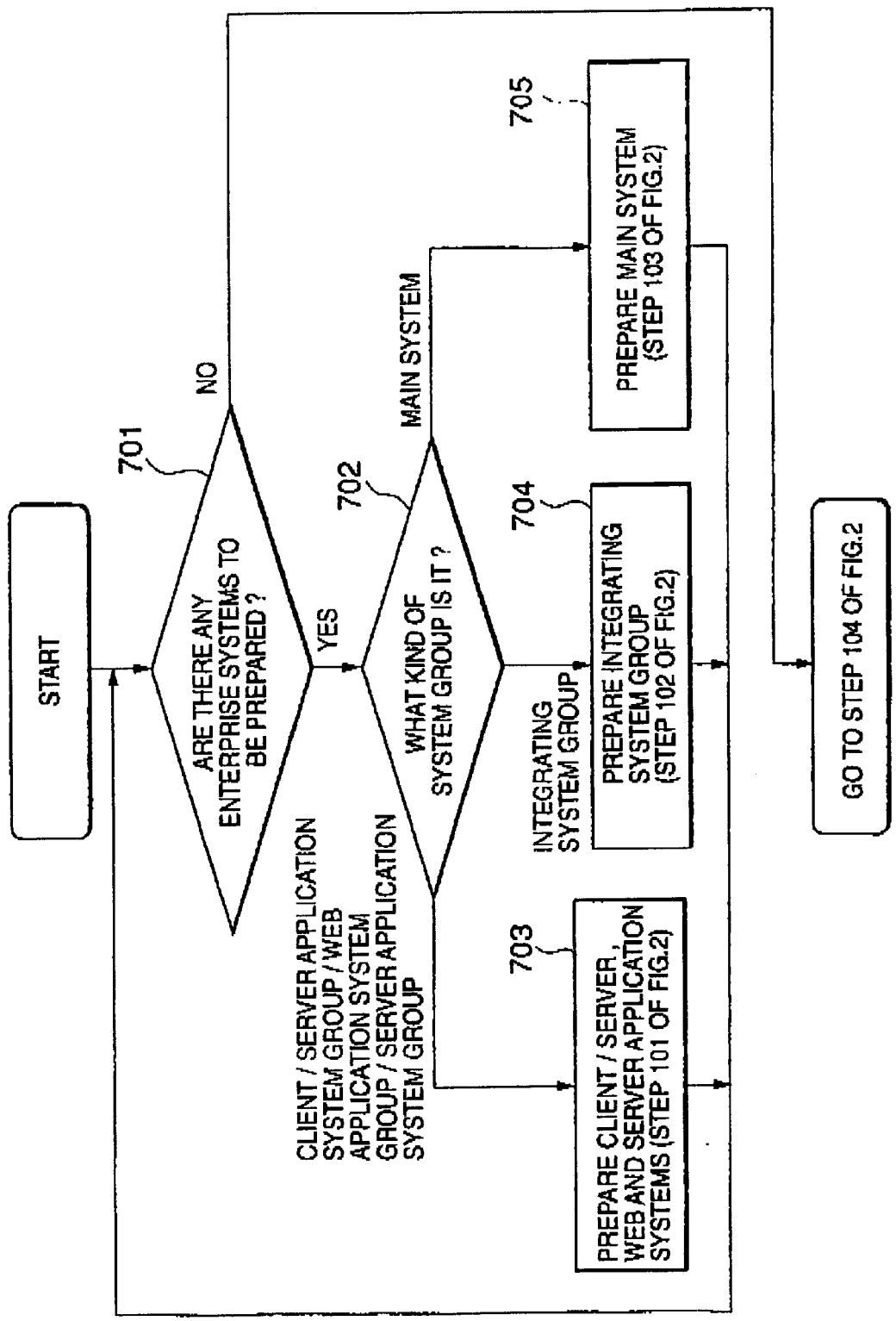
FIG. 6 is a flow chart for explaining a modified example of FIG. 2.

Furthermore, the order of steps 101, 102 and 103 is optionally determined. Specifically, as shown in FIG. 6, the order of steps 101, 102 and 103 is not limited so that, for example, step 102 could be carried out after all the client/server application systems are prepared. That is, it is determined whether there are any enterprise systems to be prepared (step 701), and either of steps 101, 102 and 103 of FIG. 2 may be carried out in accordance with the kind of the system group in any order.

Therefore, the integrating systems prepared at step 102 are utilized for constructing a hierarchical possessive relationship between the client/server application system group, Web application system group and server application system group which have been prepared at step 101 (step 104).

Specifically, the hierarchical possessive relationship between the client/server application system group, Web application system group and server application system group is constructed as a tree structure, the vertex of which is each of integrating systems.

Finally, the client/server application system group, Web application system group and server application system group which have been prepared at step 101, the integrating system group prepared at step 102, and the main system prepared at step 103 are integrated (step 105).

Specifically, the client/server application system group, the Web application system group, the server application system group and the integrating system group, together with the main system, are compiled and linked to be integrated as one enterprise system.

[System for Supporting Construction of Enterprise System]

Referring to FIGS. 7 through 10, a system for supporting the construction of an enterprise system, which realizes the enterprise system constructing method shown in FIG. 2, will be described below. Furthermore, a system for supporting the construction of an enterprise system in this preferred embodiment is a tool for supporting the preparation of an enterprise system (an application) in accordance with the enterprise system constructing method shown in FIG. 2, using the enterprise system framework shown in FIG. 1, and has (1) the function of preparing an application using a framework, as well as (2) the basic function of retrieving, preparing (editing), registering and deleting frameworks. Furthermore, this tool uses both of development and executable environments based on Java language or C++ language for the preparation and compile/link of frameworks. This tool does not include the functions of language editor, compiler and so forth. This tool is executed on the existing computer, and guides the enterprise system constructing method shown in FIG. 2, on the premise that the user selects and uses the existing executable environment if necessary.

First, referring to FIG. 7, the configuration of a system for supporting the construction of an enterprise system (which will be also hereinafter simply referred to as a "support tool") will be described below.

Figure 7:
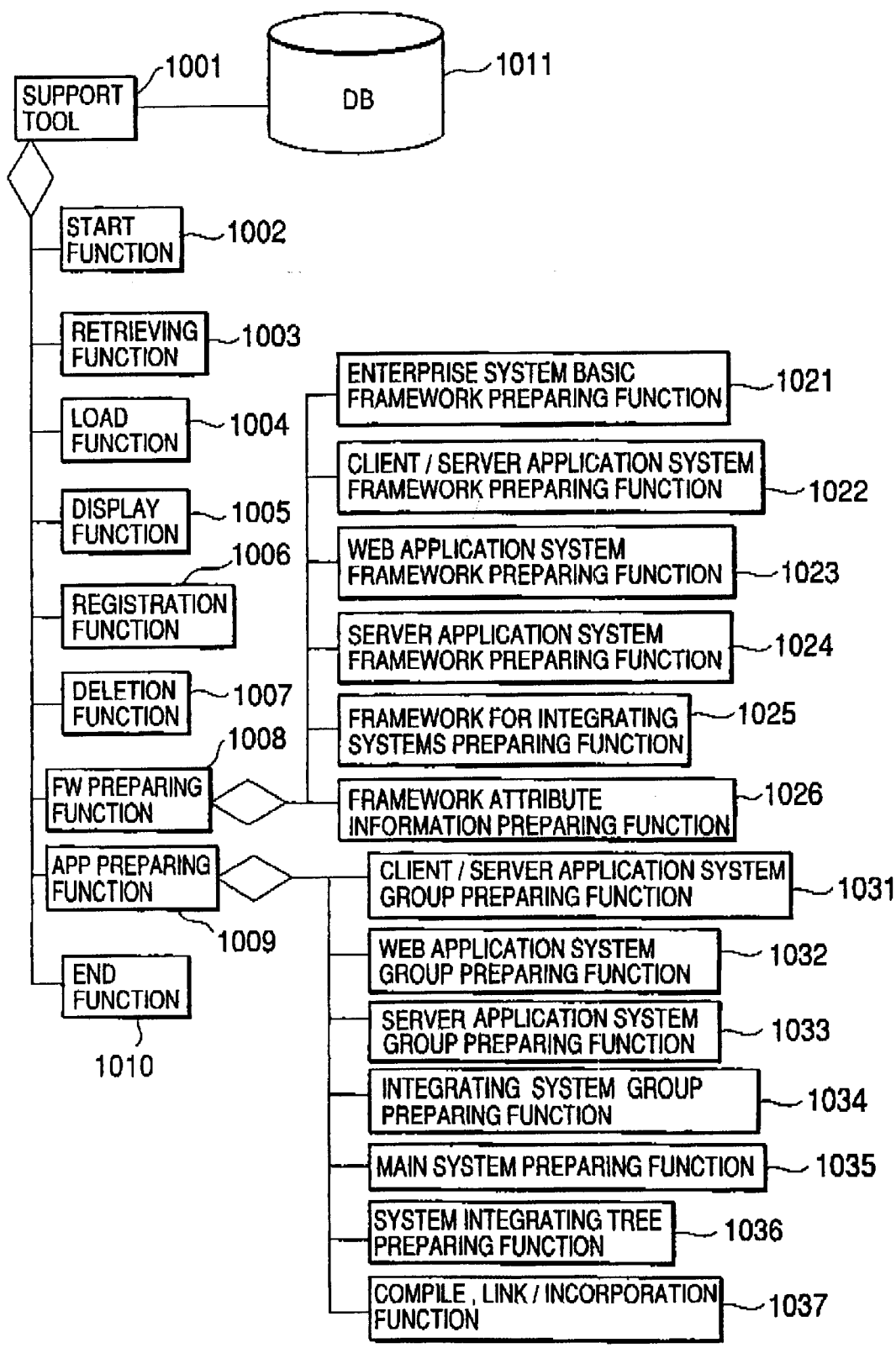
FIG. 7 is a block diagram of a system for supporting the construction of an enterprise system, which realizes a method for constructing an enterprise system.

As shown in FIG. 7, the support tool 1001 has the following eleven functions executed on the existing computer:

(a) Start Function 1002: the function of starting the support tool to display a tool menu, which displays the function of being capable of being executed by the support tool, on a screen of a computer;

(b) Retrieving Function 1003: the function of retrieving a framework, which has the structure shown in FIG. 1, from a database 1011 on the basis of retrieval conditions;

(c) Load Function 1004: the function of loading the framework, which is retrieved from the database 1011, on the computer at a specified place;

(d) Display Function 1005: the function of displaying attribute information, such as description and specification, of the framework which is retrieved from the database 1011;

(e) Registration Function 1006: the function of registering the prepared framework in the database 1011;

(f) Deletion Function 1007: the function of deleting the retrieved or specified framework from the database 1011;

(g) Framework (FW) Preparing Function 1008: the function of supporting the preparation of a framework having the structure shown in FIG. 1;

(h) Application (App) Preparing Function 1009: the function of supporting the preparation of an application using a framework;

(i) End Function 1010: the function of ending the support tool; and (j) Database (DB) 1011: the function of registering the framework, which has been prepared by the support tool, and the attributes thereof.

Furthermore, among the above described functions (a) through (j), the framework preparing function 1008 in (g) has the following six sub-functions:

(g-1) Enterprise System Basic Framework Preparing Function 1021: the function of supporting of the preparation of a framework corresponding to the enterprise system basic framework 11 shown in FIG. 1;

(g-2) Client/Server Application System Framework Preparing Function 1022: the function of supporting the preparation of a framework corresponding to the client/server application system framework 12 shown in FIG. 1;

(g-3) Web Application System Framework Preparing Function 1023: the function of supporting the preparation of a framework corresponding to the Web application system framework 13 shown in FIG. 1;

(g-4) Server Application System Framework Preparing Function 1024; the function of supporting the preparation of a framework corresponding to the server application system framework 14 shown in FIG. 1;

(g-5) Framework For Integrating Systems Preparing Function 1025: the function of supporting the preparation of a framework corresponding to the framework for integrating systems 15 shown in FIG. 1; and (g-6) Framework Attribute Information Preparing Function 1026: the function of preparing framework attribute information with respect to each of frameworks, each of which constitutes the enterprise system framework 10 shown in FIG. 1, such as information about name of each of the frameworks, name of a class constituting each of the frameworks, the coverage of the frameworks, the applicable point of the frameworks, the modified history and the development environment for utilizing the framework to develop an application.

In addition, the above described application preparing function 1009 in (h) has the following seven sub-functions:

(h-1) Client/Server Application System Group Preparing Function 1031: the function of supporting the processing at step 101a of FIG. 2;

(h-2) Web Application System Group Preparing Function 1032: the function of supporting the processing at step 101b of FIG. 2;

(h-3) Server Application System Group Preparing Function 1033: the function of supporting the processing at step 101c of FIG. 2;

(h-4) Integrating System Group Preparing Function 1034: the function of supporting the processing at step 102 of FIG. 2;

(h-5) Main System Preparing Function 1035: the function of supporting the processing at step 103 of FIG. 2;

(h-6) System Integrating Tree Preparing Function 1036: the function of supporting the processing at step 104 of FIG. 2; and (h-7) Compile, Link/Incorporation Function 1037: the function of supporting the processing at step 105 of FIG. 2.

Furthermore, among the above described functions (a) through (j), the retrieving function 103, the load function 1004, the display function 1005, the registration function 1006, the deletion function 1007 and the framework preparing function 1008 constitute means for carrying out processing such as retrieval, editing, registration and deletion with respect to the frameworks held in the database 1011.

Figure 8:
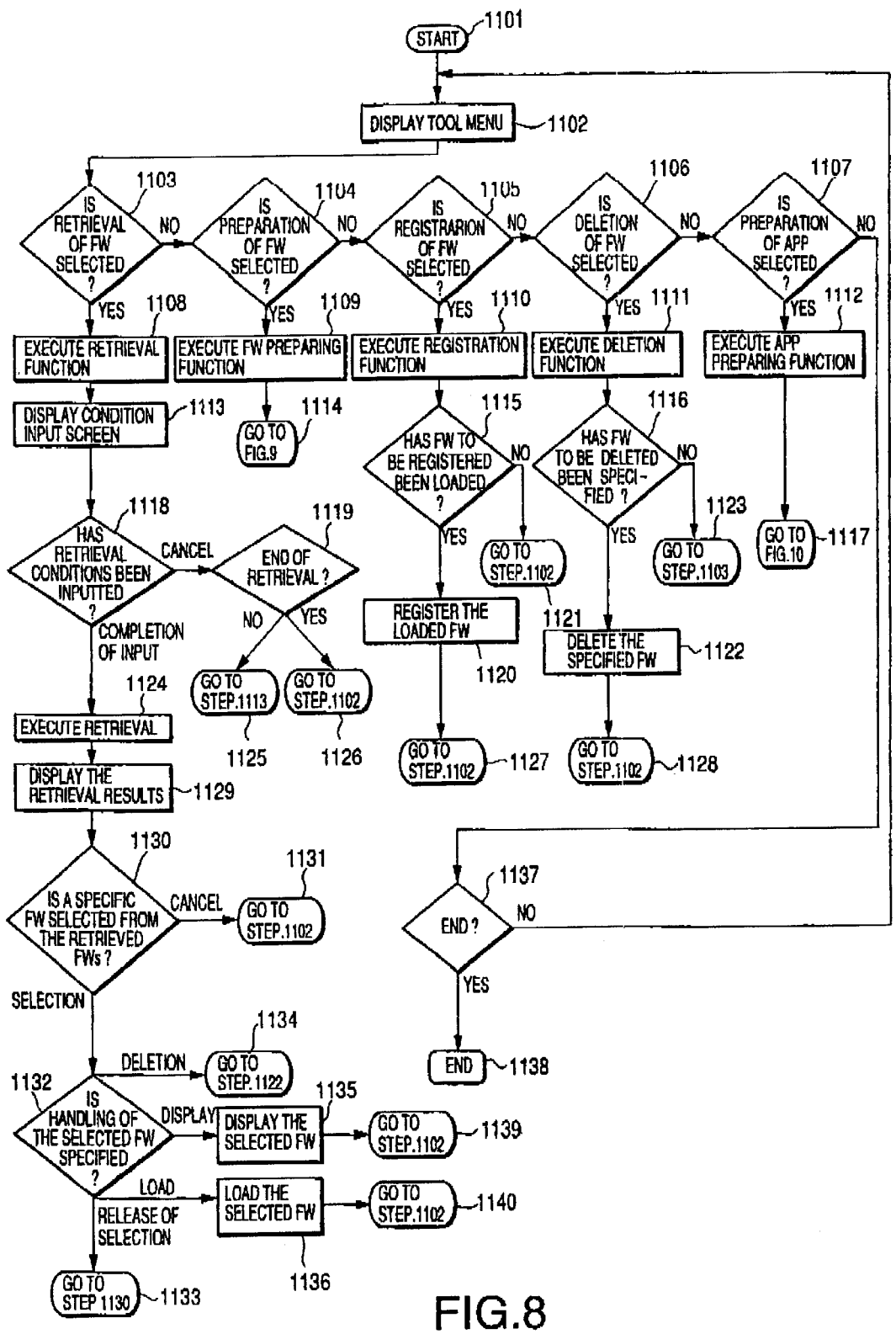
FIG. 8 is a flow chart for explaining the operation of a system for supporting the construction of an enterprise system, which is shown in FIG. 7.
Figure 9:
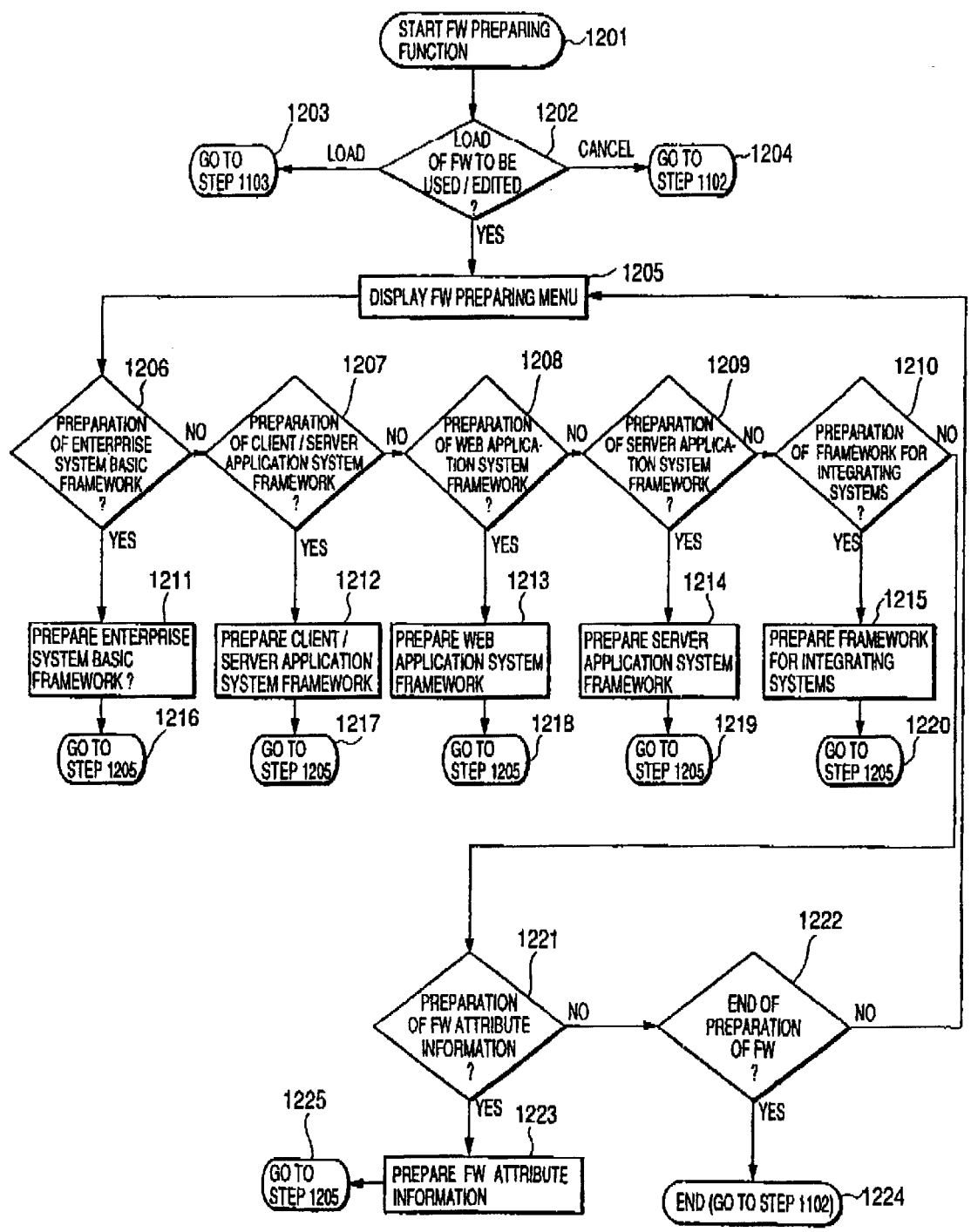
FIG. 9 is a flow chart for explaining the operation of the framework preparing function for a system for supporting the construction of an enterprise system, which is shown in FIG. 7.
Figure 10:
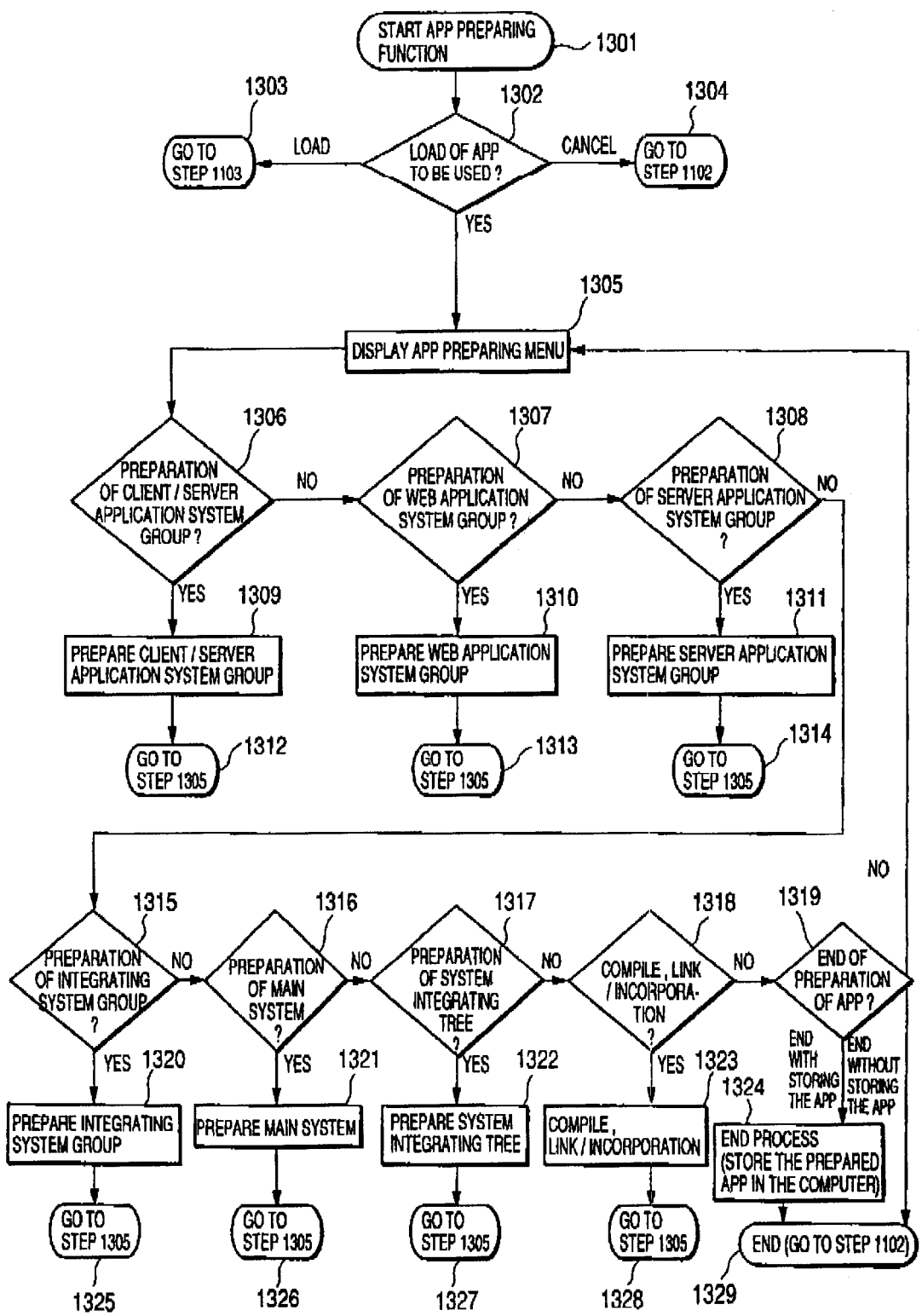
FIG. 10 is a flow chart for explaining the operation of the application preparing function for a system for supporting the construction of an enterprise system, which is shown in FIG. 7.

Referring to FIGS. 8 through 10, the operation of the system for supporting the construction of an enterprise system (the support tool) shown in FIG. 7 will be described below.

First, when the start function 1002 is executed, the support tool starts (step 1101), and then, a tool menu is displayed on the screen of the computer (step 1102).

Thereafter, if the user selects a specific menu item from the tool menu, the following processing is carried out in accordance with the selected menu item.

<Retrieval of Framework>

If the user selects the retrieval of a framework (step 1103), the retrieval function 1003 is executed (step 1108) to display a condition input screen for allowing the user to input retrieval conditions (step 1113).

Thereafter, if the user inputs retrieval conditions (step 1118), a framework is retrieved from the database 1011 on the basis of the inputted retrieval conditions (step 1124) to display the results of the retrieval on the screen (step 1129).

The user may herein select a specific framework from the displayed results of the retrieval (step 1130) to specify the handling of the selected framework (step 1132). Specifically, when the selected framework is deleted (step 1132), the routine goes to step 1122 (step 1134) to execute the deletion function 1007. In addition, when the selected framework is displayed (step 1132), the configuration of the selected framework mainly including the attribute information thereof is displayed (step 1135), and then, the routine returns to step 1102 to display the tool menu (step 1139). Moreover, when the selected framework is loaded (step 1132), the load function 1004 is executed to load the selected framework on the computer at a specified place (step 1136), and then, the routine returns to step 1102 to display the tool menu (step 1140).

Furthermore, in the above described processing, when the input of the retrieval conditions is canceled (step 1118) to end the retrieval function 1003 (step 1119), the routine returns to step 1102 to display the tool menu (step 1126). On the other hand, when the retrieval function 1003 does not end (step 1119), the routine returns to step 1113 to display the condition input screen (step 1125).

In addition, in the above described processing, when it is canceled that the specific framework is selected from the displayed results of the retrieval (step 1130), the routine returns to step 1102 to display the tool menu (step 1131).

Moreover, in the above described processing, when the 10 specific framework is selected from the displayed results of the retrieval (step 1130), and then, when the selection is released (step 1132), the routine returns to step 1130 to select the specific framework again (step 1133).

<Preparation of Framework>

In FIG. 8, if the user selects the preparation of a framework (step 1104), the framework preparing function 1008 is executed (step 1109). Furthermore, the subsequent processing will be described referring to FIG. 9 (step 1114).

As shown in FIG. 9, when the framework preparing function 1008 starts (step 1201), it is confirmed whether the framework to be used or edited has been loaded on the computer at the specified place (step 1202).

If it is required to newly load the framework (step 1202), the routine returns to step 1103 to retrieve the framework (step 1203). In addition, when the preparation of the framework is canceled (step 1202), the routine returns to step 1102 to display the tool menu (step 1204).

On the other hand, when the loading of the framework is completed or when a framework is intended to be newly prepared (step 1202), a framework preparing menu is displayed (step 1205).

Thereafter, when an enterprise system basic framework is intended to be prepared (step 1206), the enterprise system basic framework preparing function 1021 is used for modifying and/or editing a portion of the loaded framework corresponding to an 35 enterprise system basic framework or for newly defining a framework, to prepare an enterprise system basic framework (step 1211). Furthermore, when the preparation ends the load function 1004 is executed to load the prepared framework or attribute information on the computer at a specified place, and then, the routine returns to step 1205 to display the framework preparing menu (step 1216).

When a client/server application system framework is intended to be prepared (step 1207), the client/server application system framework preparing function 1022 is used for modifying and/or editing a portion of the loaded framework corresponding to a client/server application system framework or for newly defining a framework, to prepare a client/server application system framework (step 1212). Furthermore, when the preparation ends, the load function 1004 is executed to load the prepared framework or attribute information on the computer at a specified place, and then, the routine returns to step 1205 to display the framework preparing menu (step 1217).

When an Web application system framework is intended to be prepared (step 1208), the Web application system framework preparing function 1023 is used for modifying and/or editing a portion of the loaded framework corresponding to an Web application system framework or for newly defining a framework, to prepare an Web application system framework (step 1213). Furthermore, when the preparation ends, the load function 1004 is executed to load the prepared framework or attribute information on the computer at a specified place, and then, the routine returns to step 1205 to display the framework preparing menu (step 1218).

When a server application system framework is intended to be prepared (step 1209), the server application system framework preparing function 1024 is used for modifying and/or editing a portion of the loaded framework corresponding to a server application system framework or for newly defining a framework, to prepare a server application system framework (step 1214). Furthermore, when the preparation ends, the load function 1004 is executed to load the prepared framework or attribute information on the computer at a specified place, and then, the routine returns to step 1205 to display the framework preparing menu (step 1219).

When a framework for integrating systems is intended to be prepared (step 1210), the framework for integrating systems preparing function 1025 is used for modifying and/or editing a portion of the loaded framework corresponding to a framework for integrating systems or for newly defining a framework, to prepare a framework for integrating systems as a framework for integrating the frameworks which have been prepared at steps 1211 through 1214 (step 1215). Furthermore, when the preparation ends, the load function 1004 is executed to load the prepared framework or attribute information on the computer at a specified place, and then, the routine returns to step 1205 to display the framework preparing menu (step 1220).

When framework attribute information is intended to be prepared (step 1221), the framework attribute information preparing function 1026 is used for preparing framework attribute information with respect to the prepared frameworks, such as information about name of each of the frameworks, name of a class constituting each of the frameworks, the coverage of the frameworks, the applicable point of the frameworks, the modified history and the development environment for utilizing the framework to develop an application (step 1223). Furthermore, when the preparation ends, the load function 1004 is executed to load the prepared framework or attribute information on the computer at a specified place, and then, the routine returns to step 1205 to display the framework preparing menu (step 1225).

Furthermore, the preparation of the framework is intended to end (step 1222), the load function 1004 is executed to load the prepared framework or attribute information on the computer at a specified place, and then, the routine returns step 1102 to display the tool menu (step 1224). On the other hand, when the preparation is not ended (step 1222), the routine returns to step 1205 to display the framework preparing menu.

<Registration of Framework>

In FIG. 8, if the user selects the registration of a framework (step 1105), the registration function 1006 is executed (step 1110).

If the framework to be registered has been loaded on the computer at a specified place (step 1115), the loaded framework is registered in the database 1011 (step 1120), and the routine returns to step 1102 to display the tool menu (step 1127). On the other hand, if the framework to be registered has not been loaded on the computer at the specified place (step 1115), the routine returns to step 1102 (step 1121). This allows the user to cagily carry out the loading of a framework through the retrieval and editing of a framework.

<Deletion of Framework>

In FIG. 8, if the user selects the deletion of a framework (step 1106), the deletion function 1007 is executed (step 1111).

If the framework to be deleted has been specified (step 1116), the specified framework is deleted from the database 1011 (step 1122), and the routine returns to step 1102 to display the tool menu (step 1128). On the other hand, if the framework to be deleted has not been specified (step 1116), the routine returns to step 1103 to retrieve a framework (step 1123).

<Preparation of Application>

In FIG. 8, if the user selects the preparation of an application (step 1107), the application preparing function 1009 is executed (step 1112). Furthermore, the subsequent processing will be described referring to FIG. 10 (step 1117).

As shown in FIG. 10, when the application preparing function 1009 starts (step 1301), it is confirmed whether the framework to be utilized has been loaded on the computer at a specified place (step 1302).

If it is required to newly load the framework (step 1302), the routine returns to step 1103 to retrieve the framework (step 1303). In addition, when the preparation of the application is canceled (step 1302), the routine returns to step 1102 to display the tool menu (step 1304).

On the other hand, when the loading of the framework is completed (step 1302), an application preparing menu is displayed (step 1305).

Thereafter, when a client/server application system group is intended to be prepared (step 1306), the client/server application system group preparing function 1031 is used for inheriting and customizing a portion of the loaded framework corresponding to a client/server application system, to prepare a client/server application system group (step 1309). Furthermore, when the preparation ends, the routine returns to step 1305 to display the application preparing menu (step 1312).

When an Web application system group is intended to be prepared (step 1307), the Web application system group preparing function 1032 is used for inheriting and customizing a portion of the loaded framework corresponding to an Web application system framework, to prepare an Web application system group (step 1310). Furthermore, when the preparation ends, the routine returns to step 1305 to display the application preparing menu (step 1313).

When a server application system group is intended to be prepared (step 1308), the server application system group preparing function 1033 is used for inheriting and customizing a portion of the loaded framework corresponding to a server application system framework, to prepare a server application system group (step 1311). Furthermore, when the preparation ends, the routine returns to step 1305 to display the application preparing menu (step 1314).

When an integrating system group is intended to be prepared (step 1315), the integrating system group preparing function 1034 is used for inheriting and customizing a portion of the loaded framework corresponding to a framework for integrating systems, to prepare an integrating system group (step 1320). Furthermore, when the preparation ends, the routine returns to step 1305 to display the application preparing menu (step 1325).

When a main system is intended to be prepared (step 1316), the main system preparing function 1035 is used for inheriting and customizing a portion of the loaded framework corresponding to an enterprise system basic framework, to prepare a main system for handling the whole system (step 1321). Furthermore, when the preparation ends, the routine returns to step 1305 to display the application preparing menu (step 1326).

When a system integrating tree is intended to be prepared (step 1317), the system integrating tree preparing function 1036 is used for defining a hierarchical possessive relationship between systems, with respect to the client/server application system group, Web application system group and server application system group which are prepared at steps 1309 through 1311, and the integrating system group prepared at step 1320 (step 1322). Furthermore, when the preparation ends, the routine returns to step 1305 to display the application preparing menu (step 1327).

When the application prepared by inheriting and customizing the framework is intended to be compiled, linked and incorporated (step 1318), the compile, link/incorporation function 1037 is used for incorporating the client/server application system group, Web application system group and server application system group, which have been prepared at steps 1309 through 1311, the integrating system group, which has been prepared at step 1320, and the main system, which has been prepared at step 1322, as a single enterprise system (step 1323). Furthermore, when the preparation ends, the routine returns to step 1305 to display the application preparing menu (step 1328).

Furthermore, when the preparation of the application is intended to end (step 1319) and when the prepared application is intended to be stored, the application preparing function 1009 is ended, and the application is stored in the computer at a specified place (step 1324). Thereafter, the routine returns to step 1102 to display the tool menu (step 1329). On the other hand, when the prepared application is not intended to be stored, the application preparing function 1009 is ended, and then, the routine returns to step 1102 to display the tool menu (step 1329). Furthermore, when the application is not intended to end in order to continue to modify and edit the application, the routine returns to step 1305 to display the application preparing menu.

\<End\>

In FIG. 8, if the user selects end (step 1137), the end function 1010 is executed to end the support tool (step 1138).

\<Continuation of Tool Menu\>

Furthermore, if the user does not execute any one of the retrieval of a framework, the preparation of a framework, the registration of a framework, the deletion of a framework, the preparation of an application, and end, the tool menu continues to be displayed (step 1102).

Thus, according to this preferred embodiment, the basic functions of an integrated system, which straddles the basic functions and executable environments of systems, are provided as frameworks (the enterprise system basic framework 11, the client/server application system framework 12, the Web application system framework 13, the server application system framework 14 and the framework for integrating systems 15) every executable environment relating to an enterprise system, and each of the frameworks 11, 12, 13, 14 and 15 is inherited and materialized to construct the enterprise system. Therefore, it is possible to share and reuse the basic structure of an enterprise system (the skeleton of the systems, the behaviors and attributes common to the systems and so forth), so that it is possible to easily construct an enterprise system integrating systems (a stand-alone client/server application system, a network-oriented client/server application system and a server-oriented server application system) which are executed in various executable environments.

In addition, according to this preferred embodiment, the framework for integrating systems 15 combines system groups, which are prepared by inheriting the client/server application system framework 12, the Web application system framework 13 and the server application system framework 14, respectively, by the hierarchical possessive relationship. Therefore, it is possible to easily add, delete and extend a system, so that it is possible to flexibly and easily change and extend an enterprise system in accordance with specification change and function extension.

Moreover, according to this preferred embodiment, the basic functions of a system are provided as frameworks (the client/server application framework 12, the Web application framework 13 and the server application system framework 14) every executable environment relating to an enterprise system. Therefore, if developers reuse and share the frameworks, it is possible to rapidly construct an enterprise system.

Furthermore, in the above described preferred embodiment, each of the enterprise system basic framework 11, the client/server application system framework 12, the Web application system framework 13, the server application system framework 14 and the framework for integrating systems 15 preferably includes a plurality of abstract classes having a hierarchical structure based on an inheritance relationship. In addition, each of the abstract classes is preferably mixed with an abstract method and a concrete method.

Figure 24:
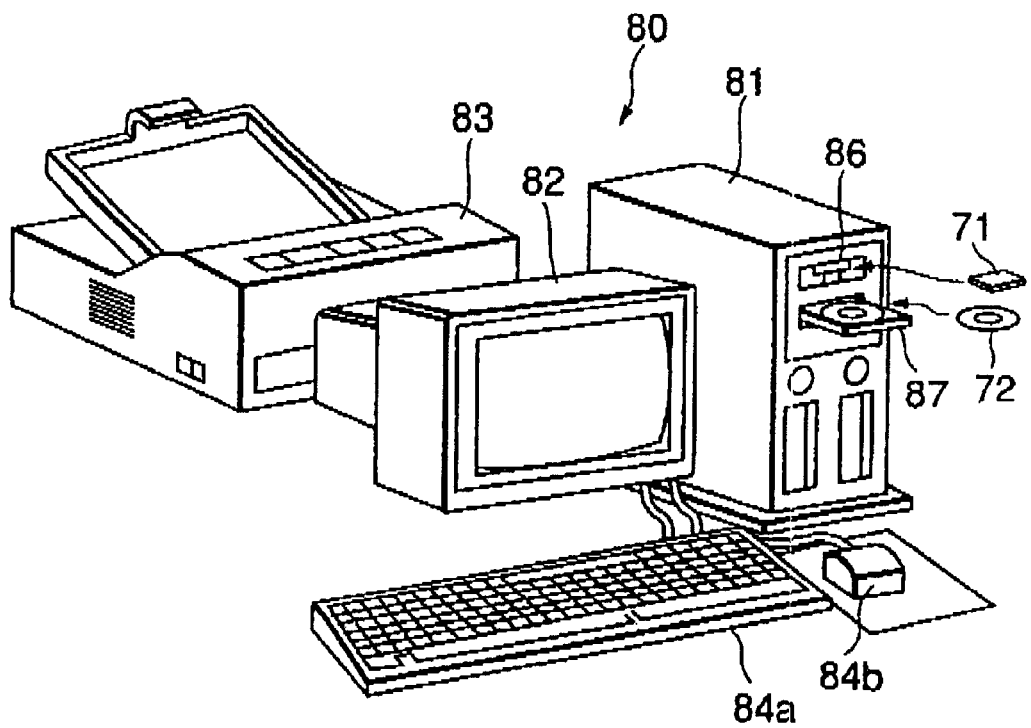
FIG. 24 is a perspective view showing the appearance of a computer system as a premise of the enterprise system framework shown in FIG. 1.

In addition, in the above described preferred embodiment, as shown in FIG. 24, the enterprise system framework 10 shown in FIG. 1 can be recorded in a computer readable recording medium, such as a floppy disk 71 or a CD-ROM 72. If the enterprise system framework 10 is installed in a computer system 80 by a predetermined procedure, it is possible to construct an enterprise system in accordance with the procedure shown in FIGS. 2 through 6. In addition, each of the function of the system for supporting the construction of an enterprise system, shown in FIG. 7, can be realized as a program component. As shown in FIG. 24, a program for supporting the construction of an enterprise system, comprising such program components, can also be recorded in a computer readable recording medium, such as the floppy disk 71 and CD-ROM 72, and can support the construction of an enterprise system in accordance with the procedure shown in FIGS. 8 through 10.

The computer system 80 comprises: a computer body 81 housed in a housing, such as a mini tower; a display unit 82, such as a cathode ray tube (CRT); a printer 83 serving as a recording output unit 83; a keyboard 84a and mouse 84b serving as input units; a floppy disk drive unit 86 for reading data out of the floppy disk 71 serving as a recording medium; and a CD-ROM drive unit 87 for reading data out of the CD-ROM 72 serving as a recording medium. In addition, an internal memory (not shown), such as a random access memory (RAM), and a hard disk unit (not shown) are provided in the computer body 81.

Furthermore, the recording media according to the present invention should not be limited to the floppy disk and the CD-ROM. The recording media include any recording forms of recording media capable of recording programs and frameworks and being red by a computer, such as magnetic disks, internal memories, hard disks, optical disks (a CD-R, a digital versatile disk (DVD), etc.), magneto-optical disks (MO), and semiconductor memories. The recording media also include carrier waves transmitted on a network, and information transmitting media.

In addition, an operating system (OS), which operates on a computer on the basis of the instruction of a program installed in the computer from a recording medium, and a middleware (MW), such as a data base management software and a network software, may execute a part of each processing for realizing this preferred embodiment.

Moreover, the recording media according to the present invention should not be limited to media independent of the computer. The recording media according to the present invention may media in which programs or frameworks transmitted via an LAN or Internet have been downloaded to be stored or temporarily stored.

In addition, the number of recording media should not be limited to one. The processing in this preferred embodiment may be executed by a plurality of media according to the present invention, and the recording media may have any structures.

Moreover, in the above described preferred embodiment, the compile/link technique is adopted as a method for integrating the client/server application system group, Web application system group and server application system group, which are prepared at step 101, the integrating system group prepared at step 102, and the main system prepared at step 103. As a method for integrating these system groups, the component selecting technique or the component plug-in technique may also be used.

Figure 20:
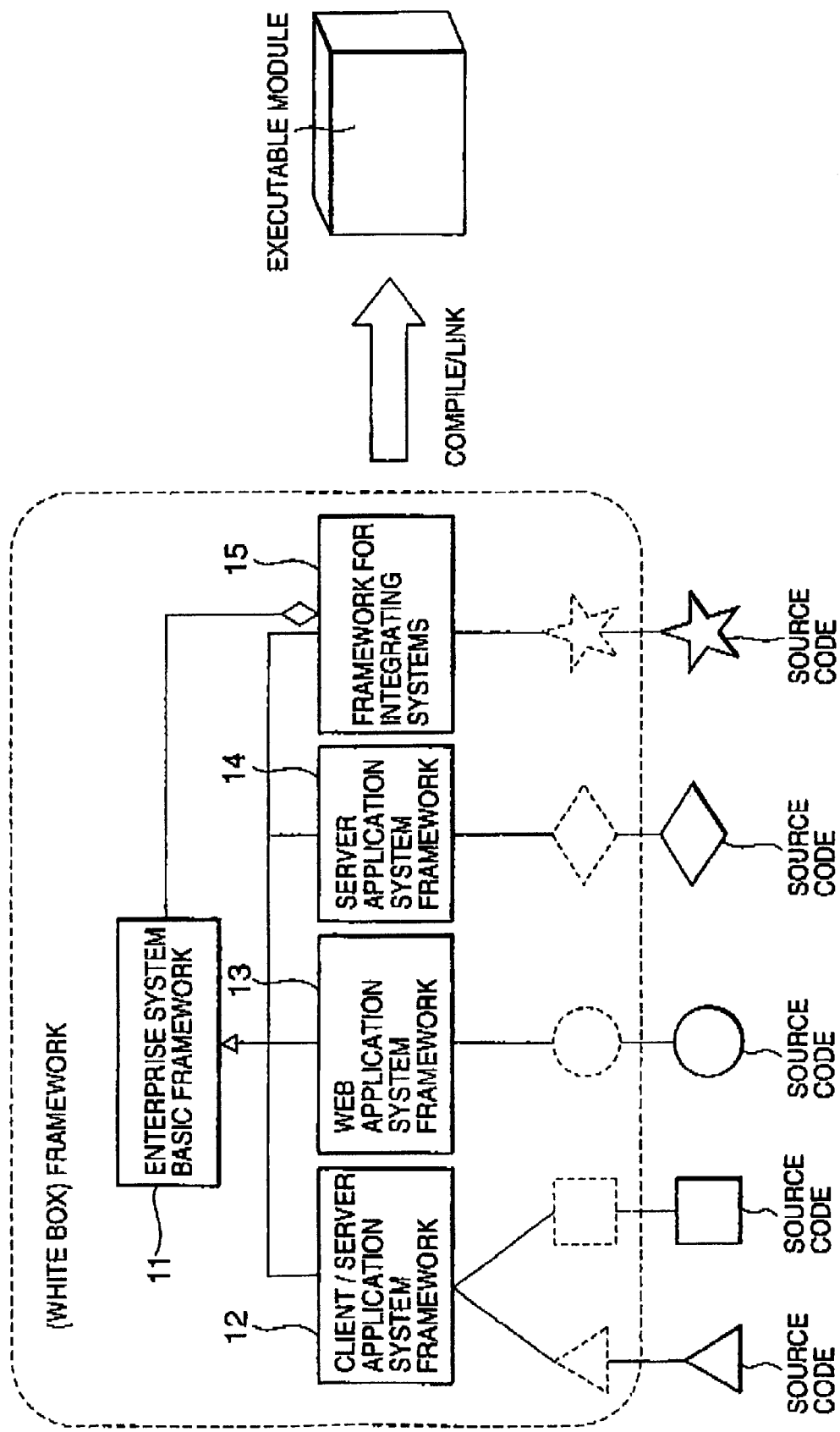
FIG. 20 is an illustration showing the flow of processing when a compile/link technique is utilized for constructing an enterprise system.
Figure 21:
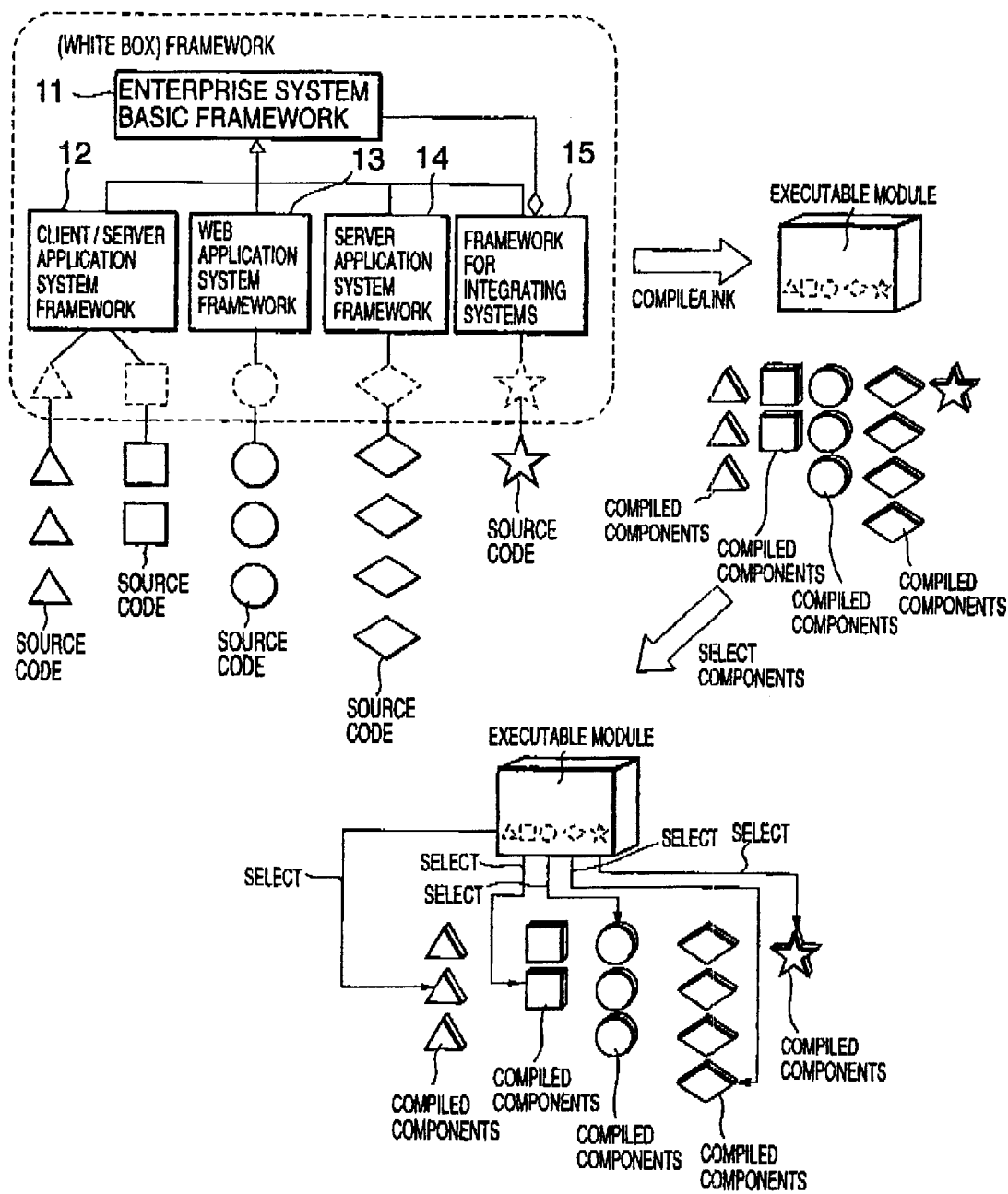
FIG. 21 is an illustration showing the flow of processing when a component selecting technique is utilized for constructing an enterprise system.
Figure 22:
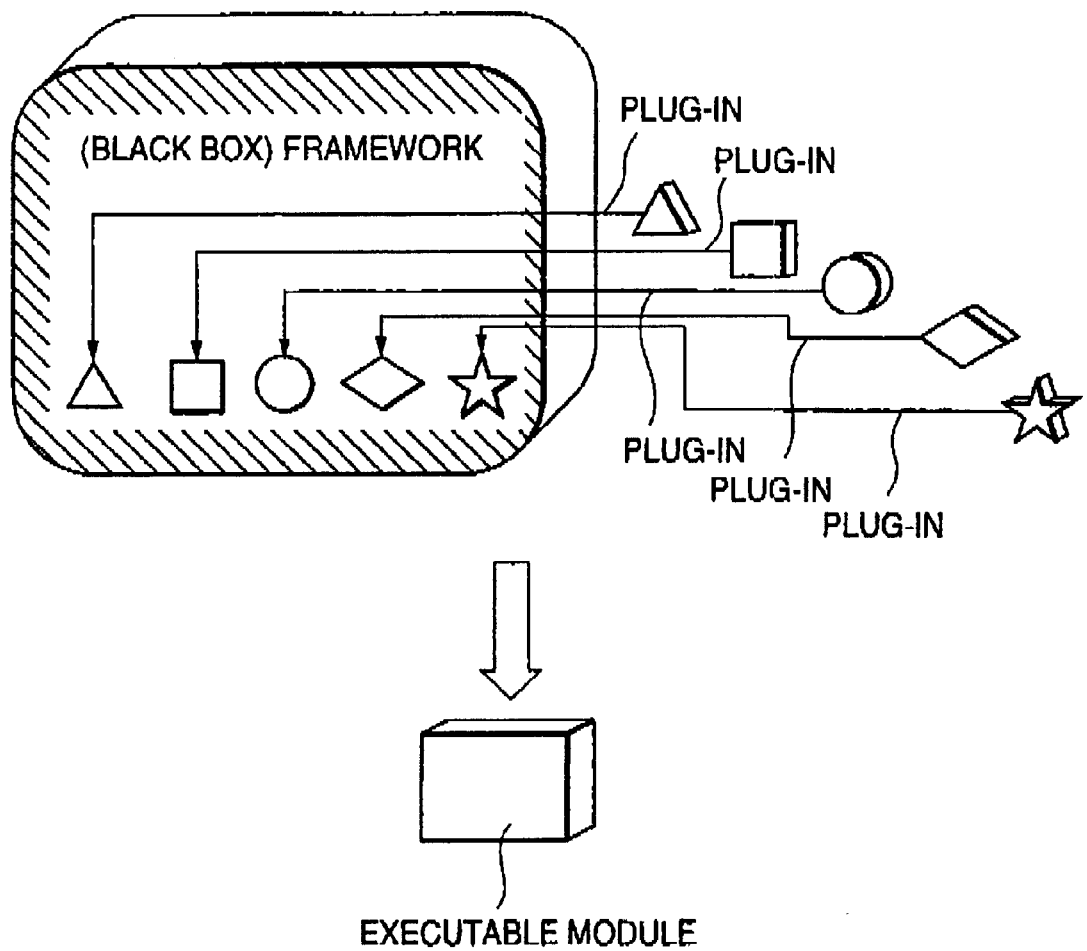
FIG. 22 is an illustration showing the flow of processing when a component plug-in technique is utilized for constructing an enterprise system.

Referring to FIGS. 20 through 22, the concept of each of the compile/link technique, the component selecting method and the component plug-in technique will be described below.

FIG. 20 is an illustration showing the flow of processing when a compile/link technique is utilized for constructing an enterprise system. As shown in FIG. 20, in this technique, an enterprise system framework is prepared as a so-called white box framework. The white box framework means a framework wherein an extension point, such as an abstract class, is used as a connection point to open internal packaging.

In this technique, sub-frameworks (the client/server application system framework 12, the Web application system framework 13, the server application system framework 14 and the framework for integrating systems 15) included in the white box framework thus prepared are inherited, and the inherited abstract class is directly overridden and customized, so that a desired extended source code is generated. Finally, the source code thus extended is compiled and linked to generate an executable module which is executable on a computer system.

FIG. 21 is an illustration showing the flow of processing when a component selecting technique is utilized for constructing an enterprise system. As shown in FIG. 21, in this technique similar to the compile/link technique shown in FIG. 20, an enterprise system framework is prepared as a white box framework.

Then, in this technique, sub-frameworks (the client/server application system framework 12, the Web application system framework 13, the server application system framework 14 and the framework for integrating systems 15) included in the white box framework thus prepared are inherited, and the inherited abstract class is directly overridden and customized, so that a desired extended source code is generated.

Thereafter, the frameworks and the plurality of source codes, which are thus prepared, are separately compiled to generate an executable module having an extension point, and a plurality of compiled components which are incorporated into the executable module to be used. The executable module can suitably select compiled components during execution and to specify a component with respect to each of the extension points. Therefore, it is possible to obtain an execute form, which is executable on a computer system, without compiling and linking the executable module and the respective components as a whole. Furthermore, in this technique, even if it is required to modify each of the components or the like, it has only to modify and compile only a source code corresponding to the component, and it is not required to carry out compile and link as a whole like the compile/link technique shown in FIG. 20.

FIG. 22 is an illustration showing the flow of processing when a component plug-in technique is utilized for constructing an enterprise system. As shown in FIG. 22, in this technique unlike the compile/link technique shown in FIG. 20 and the component selecting technique shown in FIG. 21, an enterprise system framework is prepared as a black box framework. The black box framework means a framework wherein an extension point, such as an abstract class, is used as a connection point to close internal packaging. Furthermore, the black box framework is executable on a computer system, and its Pretension point is provided as an interface inherent in a framework. In addition, the black box framework can be realized rising the existing component technique, such as Java (registered trademark), CORBA (Common Object Request Broker Architecture) or DCOM (Distributed Component Object Model). That is, since the interface can be separated from an implementation according to this component technique, three portions of a framework body, a connecting portion of the framework body, and a component incorporated into the framework body can be independently installed. Since these three portions are independent of each other, there is no influence on the framework body and the whole system even if the component incorporated into the framework body via the connecting portion is modified.

In this technique, after an object coincident with the interface of the black box framework thus prepared is generated, this object is incorporated directly into the black box framework via the interface, so that it is possible to generate an executable module which is executable on a computer system.

Examples

Examples of the above-described preferred embodiment will be described below.

[Example of Enterprise System (Enterprise Management Information Management System)]

As an example of an enterprise system having the system configuration shown in FIG. 11, an enterprise management information management system having the following characteristics is supposed.

(a) Within a business enterprise, work performance records are managed by the existing client/server environment.

(b) An intranet is practically used to provide welfare equipment & service information for in-house staff and manage schedules for in-house staff to allow information exchange.

(c) The work performance record management: and the schedule management for in-house staff are integrated to construct an in-house information system capable of carrying out staffing and resource management.

(d) Internet is practically used to carry out an order management which allows many and unspecified general customers to freely order goods and which can immediately reflect the results in in-house order business in order to pioneer new customers.

(e) The provision of the welfare equipment & service information for in-house staff, the order management and the in-house information system are integrated to construct a business information system capable of carrying out the unified management of all information about business.

(f) All information existing in a business enterprise is practically used to give service to support decision making about business policy in future.

Figure 12:
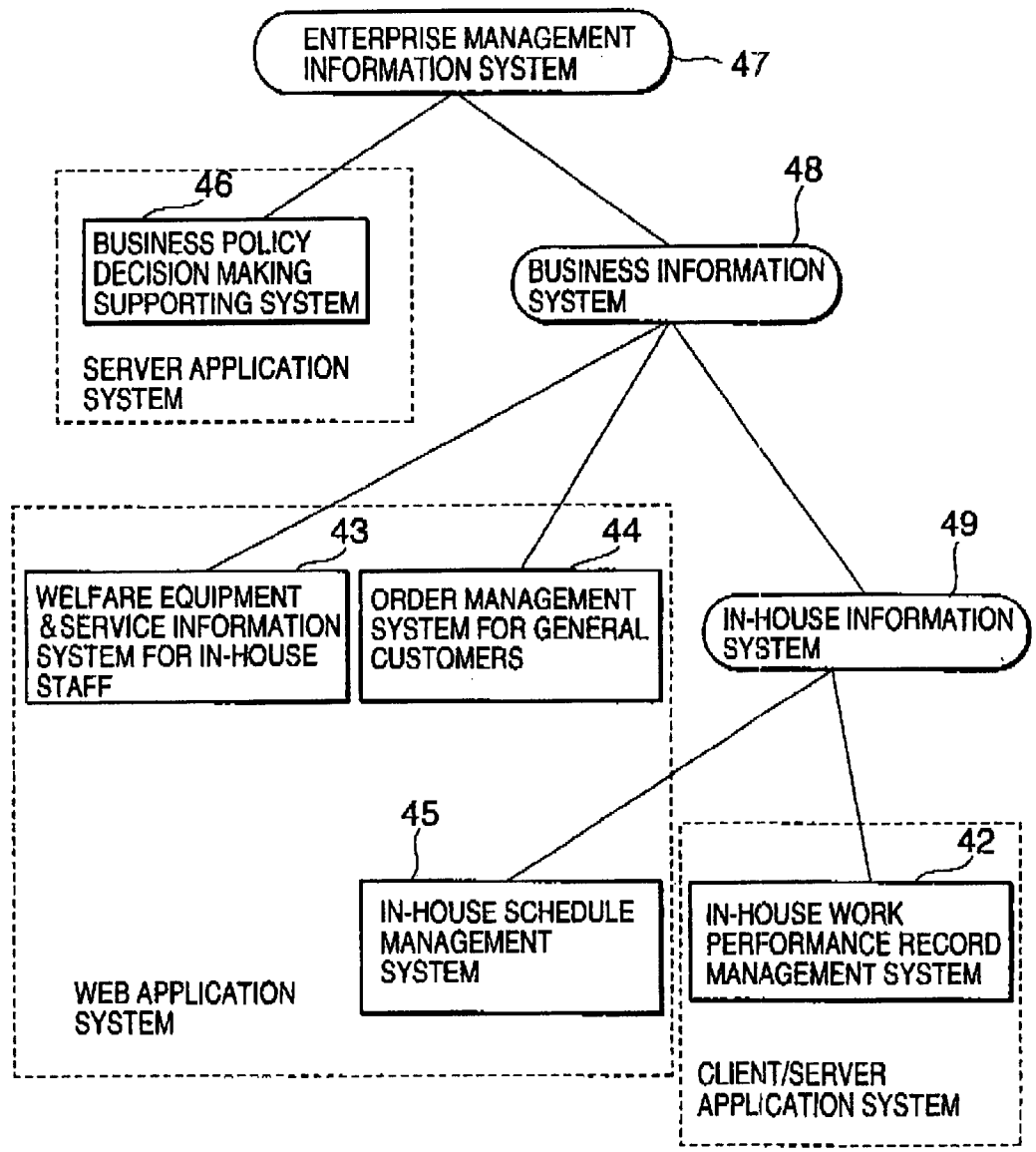
FIG. 12 is a block diagram showing an example of an enterprise management information management system (an enterprise system) as a premise of a preferred embodiment of the present invention.

FIG. 12 is a block diagram showing an example of a system configuration of an enterprise management information management system having the above described characteristics (a) through (f).

In FIG. 12, an enterprise management information system 47 is designed to integrate the whole enterprise management information management system. The enterprise management information system 47 comprises an business policy decision making supporting system 46 for supporting the decision making about business policy within a business enterprise, and a business information system 48 for supporting transaction within the business enterprise. The business information system 48 comprises an in-house information system 49 for carrying out information management about business, an welfare equipment & service information system for in-house staff 43 for providing in-house staff with welfare equipment & service information for in-house staff, an order management system for general customers 44 for accepting orders from many and unspecified general customers to carry out order processes. The in-house information system 49 comprises an in-house work performance record management system 42 for managing in-house work performance information, and an in-house schedule management system 45 for managing the schedules for each of in-house staff.

Among these systems, the business policy decision making supporting system 46 is the server application system for the executable environment defined by reference number 26 in the system configuration shown in FIG. 11. In addition, each of the welfare equipment & service information system for in-house staff 43, the order management system for general customers 44 and the in-house schedule management system 45 are the web application systems for the executable environment defined by reference number 25 in the system configuration shown in FIG. 11. Moreover, the in-house work performance record management system 42 is the client/server application system for the executable environment defined by reference number 25 in the system configuration shown in FIG. 11.

Figure 13:
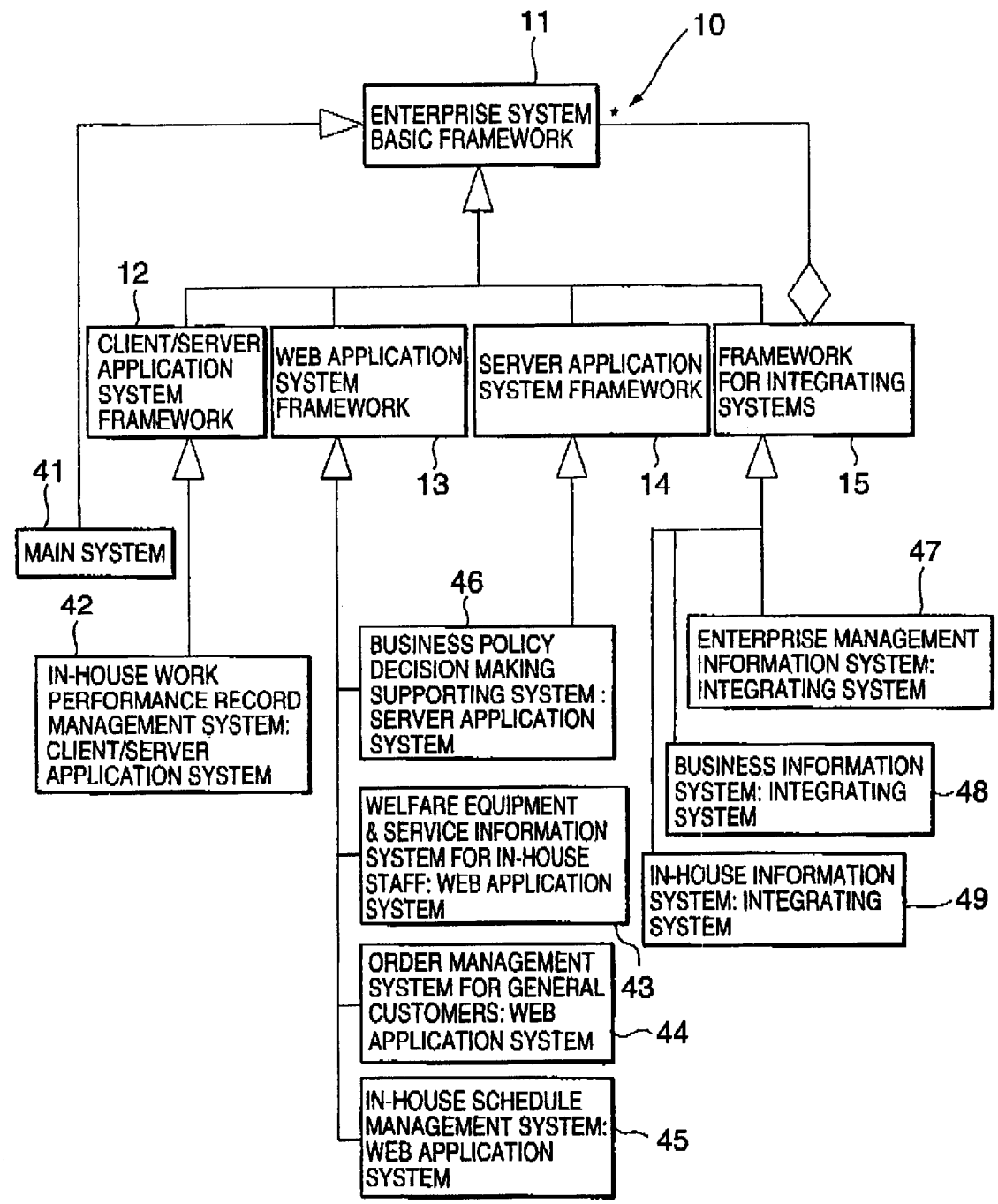
FIG. 13 is a block diagram showing the inheritance relationship between an enterprise system framework and an enterprise management information management system in a preferred embodiment of the present invention.

FIG. 13 is a block diagram showing the inheritance relationship between an enterprise management information management system and an enterprise system framework.

As shown in FIG. 13, since the in-house work performance record management system 42 is the client/server application system, this system is prepared by inheriting the client/server application framework 12. In addition, since the welfare equipment & service information system for in-house staff 43, the order management system for general customers 44 and the in-house schedule management system 45 are the Web application systems, these systems are prepared by inheriting the Web application system framework 13. Moreover, since the business policy decision making supporting system is the server application system, this system is prepared by inheriting the server application system framework 14. In addition, since the enterprise management information system 47, the business information system 48 and the in-house information system 49 are the integrating systems, these systems are prepared by inheriting the framework for integrating systems 15. Furthermore, as a main program for the whole system, the main system 41 is prepared by inheriting the enterprise system basic framework 11.

[Enterprise System Framework]

Figure 14:
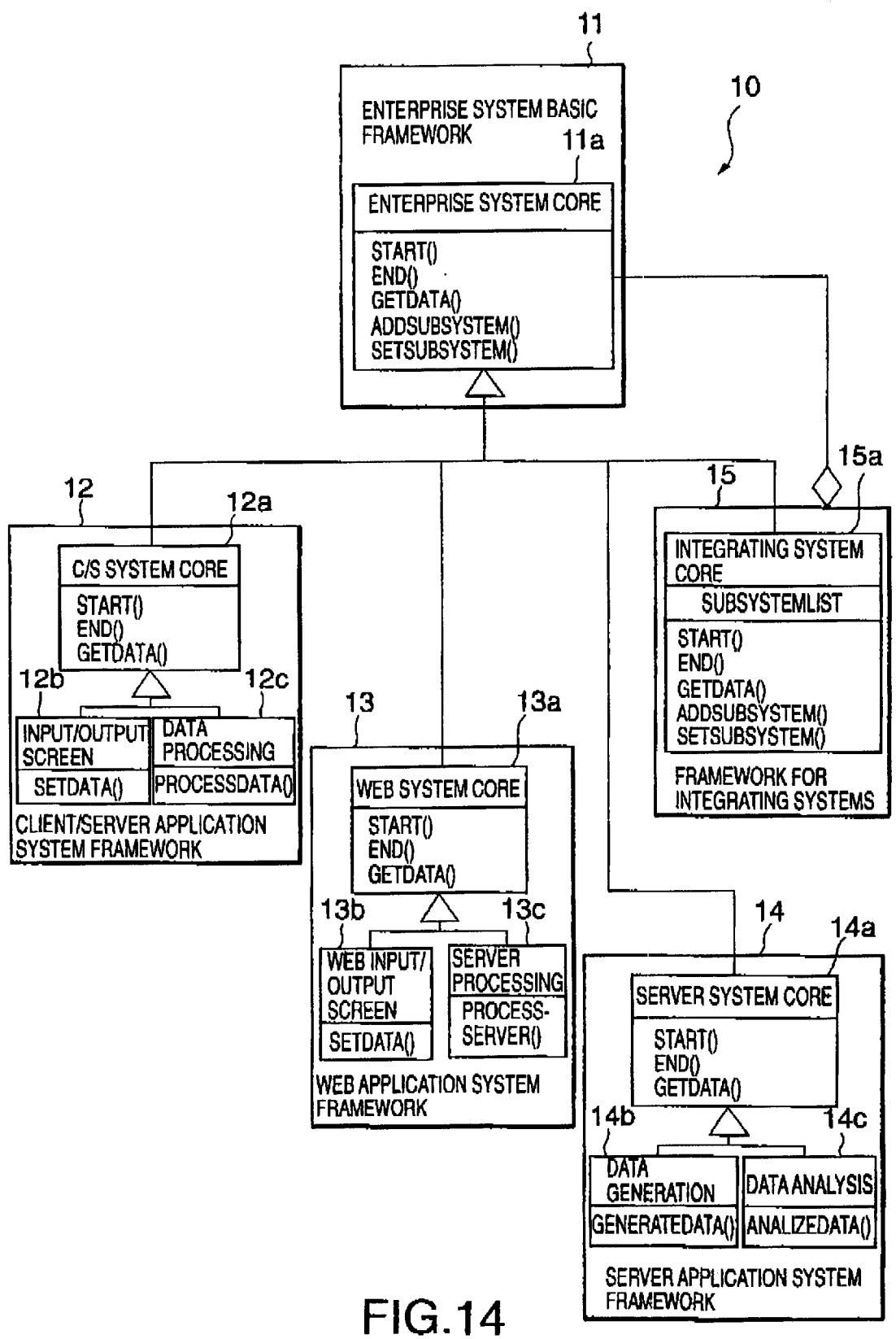
FIG. 14 is a block diagram showing a preferred embodiment of an enterprise system framework shown in FIG. 1.

FIG. 14 is a block diagram showing the details of an enterprise system framework for use in this example.

As shown in FIG. 14, the enterprise system basic framework 11 has an enterprise system core class 11a. The enterprise system core class 11a is an abstract class for providing the basic function of all of application programs, i.e., the function of starting and ending systems, acquiring data between systems, adding child systems, and setting child systems. The expression "child system" means a subsystem included in an enterprise system. The expression "setting of child systems" means to define subsystems included in system A. The expression "adding of child systems" means to add one subsystem to system A.

On the other hand, the client/server application system framework 12 has a client/server system core class 12a, an input/output screen class 12b and a data processing class 12c. The client/server system core class 12a inherits the enterprise system core class 11a, and provides the basic function of starting and ending systems, which are realized on previously supposed clients, server and database, and of acquiring data between the systems. The input/output screen class 12b inherits the client/server system core class 12a, and provides the basic function of registering data via the screen in the client/server application system. The data processing class 12c inherits the client/server system core class 12a, and provides the basic function of handling data, such as computational processing in the client/server application system.

In addition, the Web application system framework 13 has an Web system core class 13a, an Web input/output screen class 13b and a server processing class 13c. The Web system core class 13a inherits the enterprise system core class 11a, and provides the basic function of starting and ending systems, which are realized on many and unspecified clients and previously supposed database and Internet server, and of acquiring data between the systems. The Web input/output screen class 13b inherits the Web system core class 13a, and provides the basic function of registering data via the screen in the Web application system. The server processing class 13c inherits the Web system core class 13a, and provides the basic function of a server program included in the Web application system.

Moreover, the server application framework 14 has a server system core class 14a, a data generation class 14b and a data analysis class 14c. The server system core class 14a inherits the enterprise system core class 11a, and provides the basic function of starting and ending systems, which are realized on many and unspecified servers, a database previously supposed to be added, deleted and extended, and a previously supposed Internet server, and of acquiring data between the systems. The data generation class 14b inherits the server system core class 14a, and provides the basic function of acquiring data from a plurality of databases via a plurality of database servers and Web application servers, and of generating new data using the acquired data. The data analysis class 14c inherits the server system core class 14a, and provides the basic function of acquiring data from a plurality of databases via a plurality of database servers and Web application servers, and of counting and summing up data using the acquired data.

Furthermore, the framework for integrating systems 15 has an integrating system core class 15a. The integrating system core class 15a inherits the enterprise system core class 11a, and provides the basic function of expressing a hierarchical possessive relationship between a plurality of systems, which are prepared by inheriting the client/server application system framework 12, the web application system framework 13 and the server application system framework 14, respectively, as a tree structure, the vertex of which is an integrating system inheriting the framework for integrating systems. Specifically, the integrating system core class 15a provides the function of "setting child systems" and "adding child systems" as described above, in addition to the start and end of systems and the acquisition of data between systems.

[Example of Configuration of Enterprise Management Information Management System]

Figure 15:
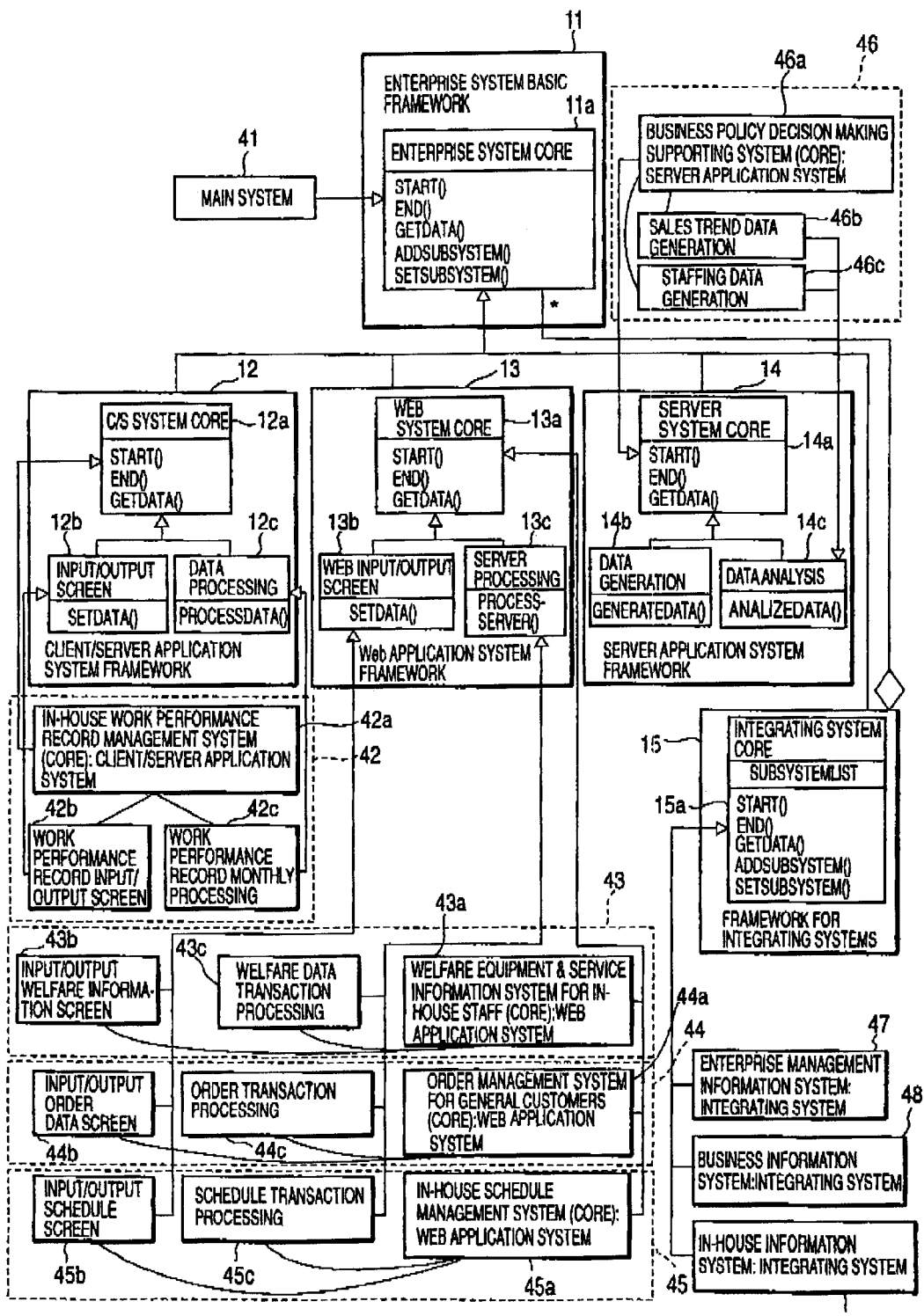
FIG. 15 is a block diagram showing an example of an enterprise management information management system which is prepared by inheriting the enterprise system framework shown in FIG. 14.

FIG. 15 is a block diagram showing an example of a configuration of an enterprise management information management system which is prepared by inheriting the enterprise system framework shown in FIG. 14.

As shown in FIG. 15, the in-house work performance record management system 42 is designed to support the input/output of work performance records via a screen to sum up monthly work performance data. The in-house work performance record management system 42 has a core class 42a, a work performance record input/output screen class 42b and a work performance record is monthly processing class 42c. The core class 42a is prepared by inheriting the client/server application system core class 12a and customizing the basic contents of a work performance record screen and a monthly data processing. The work performance record input/output screen class 42b is prepared by inheriting the input/output screen class 12b and customizing the contents of a screen layout and a data registration processing. The work performance record monthly processing class 42c is prepared by inheriting the data processing class 12c and customizing the contents of data processing.

The welfare equipment & service information system for in-house staff 43 is designed to support the input/output of welfare equipment & service information via a screen, and to batch access information and so forth to the welfare equipment & service information, which is inputted via the screen, on the side of the server to carry out registration and reference processing. The welfare equipment & service information system for in-house staff 43 has a core class 43a, an welfare equipment & service information input/output screen class 43b and an welfare data transaction processing 43c. The core class 43a is prepared by inheriting the Web system core class 13a and customizing the basic contents of an welfare equipment & service information screen and an welfare equipment & service information transaction processing. The welfare equipment & service information input/output screen class 43b is prepared by inheriting the Web input/output screen class 13b and customizing the contents of a screen layout and a data registration processing. The welfare data transaction processing 43c is prepared by inheriting the server processing class 13c and customizing the contents of server processing.

The order management system for general customers 44 is designed to support the input/output of order data via a screen, and to batch order data, which are inputted via the screen, on the side of the server to carry out registration and reference processing. The order management system for general customers 44 has a core class 44a, an order data input/output screen class 44b and an order data transaction processing class 44c. The core class 44a is prepared by inheriting the Web system core class 13a and customizing the basic contents of an order data input/output screen and an order data transaction processing. The order data input/output screen class 44b is prepared by inheriting the Web input/output screen class 13b and customizing the contents of a screen layout and a data registration processing. The order data transaction processing class 44c is prepared by inheriting the server processing class 13c and customizing the contents of server processing.

The in-house schedule management system 45 is designed to support the input/output of in-house schedule information via a screen, and to batch schedule information, which is inputted via the screen, on the side of the server to carry out registration and reference processing. The in-house schedule management system 45 is prepared by inheriting the Web system core class 13a and customizing the basic contents of a schedule data input/output screen and a schedule data transaction processing. The schedule input/output screen 45b is prepared by inheriting the Web input/output screen class 13b and customizing the contents of a screen layout and a data registration processing. The schedule transaction processing 45c is prepared by inheriting the server processing class 13c and customizing the contents of server processing.

The business policy decision making supporting system 46 is designed to generate data for predicting sales trend and to support the effective in-house staffing and the effective allotment of the contents of business on the basis of the schedules, the work performance records and the prediction of sales. The business policy decision making supporting system 46 has a core class 46a, a sales trend data generation class 46b and a staffing data generation class 46c. The core class 46a is prepared by inheriting the server system core class 14a and customizing the basic contents of sales trend data generation and staffing data generation. The staffing data generation class 46b is prepared by inheriting the data generation class 14c and customizing the processing procedure for generating sales trend data. The staffing data generation class 46c is prepared by inheriting the data generation class 14c and customizing the processing procedure for generating staffing data.

The enterprise management information system 47 is an integrating system for practically using all data existing in the business enterprise to support the decision making about business policy in future. The enterprise management information system 47 is prepared by inheriting the integrating system core class 15a and customizing the relation (the hierarchical possessive relation) to other systems.

The business information system 48 is an integrating system for integrating the provision of the welfare equipment & service information for in-house staff, the order management and the in-house information system to batch all information about business. The business information system 48 is prepared by inheriting the integrating system core class 15a and customizing the relation (the hierarchical possessive relation) to other systems.

The in-house information system 49 is an integrating system for integrating the work performance record management and the schedule management for in-house staff to allow effective staffing and resource management. The in-house information system 49 is prepared by inheriting the integrating system core class 15a and customizing the relation (the hierarchical possessive relation) to other systems.

The main system 41 is a main program for starting the enterprise management information system. The main system 41 is prepared by inheriting the enterprise system core class 11a and customizing the declaration, start and end of systems serving as components.

[Method for Constructing Enterprise Management Information Management System]

Using the enterprise system framework shown in FIG. 14 and referring to the procedure shown in FIGS. 2 through 5, a method for constructing an enterprise management information management system will be described below.

First, the client/server application system framework 12, web application system framework 13 and server application system framework 14 of the enterprise system framework 10 shown in FIG. 14 are inherited to prepare a client/server application system group, an Web application system group and a server application system group, respectively (step 101 of FIG. 2)

Specifically, as shown in FIG. 15, the client/server system core class 12a, input/output screen class 12b and data processing class 12c, which are included in the client/server application system framework 12, are inherited and customized to an in-house work performance record management system core class 42a, a work performance record input/output screen class 42b and a work performance record monthly processing class 42c to construct an in-house work performance record management system 42 (step 101a of FIG. 2).

In addition, the Web system core class 13a, Web system input/output screen class 13b and server processing class 13c, which are included in the Web application system framework 13, are inherited and customized to prepare an welfare equipment & service information system for in-house staff core class 43a, an welfare equipment & service information input/output screen class 43b and an welfare data transaction processing 43c to construct an welfare equipment & service information system for in-house staff 43 (step 101b of FIG. 2). Similarly, an order management system for general customers core class 44a, an order data input/output screen class 44b and an order data transaction processing class 44c are prepared to construct an order management system for general customers 44 (step 101b of FIG. 2). Similarly, an in-house schedule management system core class 45a, a schedule input/output screen class 45b and a schedule transaction processing class 45c are prepared to construct an in-house schedule management system 45 (step 101b of FIG. 2).

Moreover, the server system core class 14a, data analysis class 14b and data generation class 14c, which are included in the server application system framework 14, are inherited and customized to prepare a business policy decision making supporting system core class 46a, a sales trend data generation class 46b and a staffing data generation class 46c to construct a business policy decision making supporting system 46 (step 101c of FIG. 2).

Then, the integrating system core class 15a included in the framework for integrating systems 15 of the enterprise system framework 10 is inherited and customized to construct an enterprise management information system 47, a business information system 48 and an in-house information system 49 (step 102 of FIG. 2).

Then, the enterprise system core class 11a included in the enterprise system basic framework 11 of the enterprise system framework 10 is inherited and customized to prepare a main system 41 (step 103 of FIG. 2).

Figure 16:
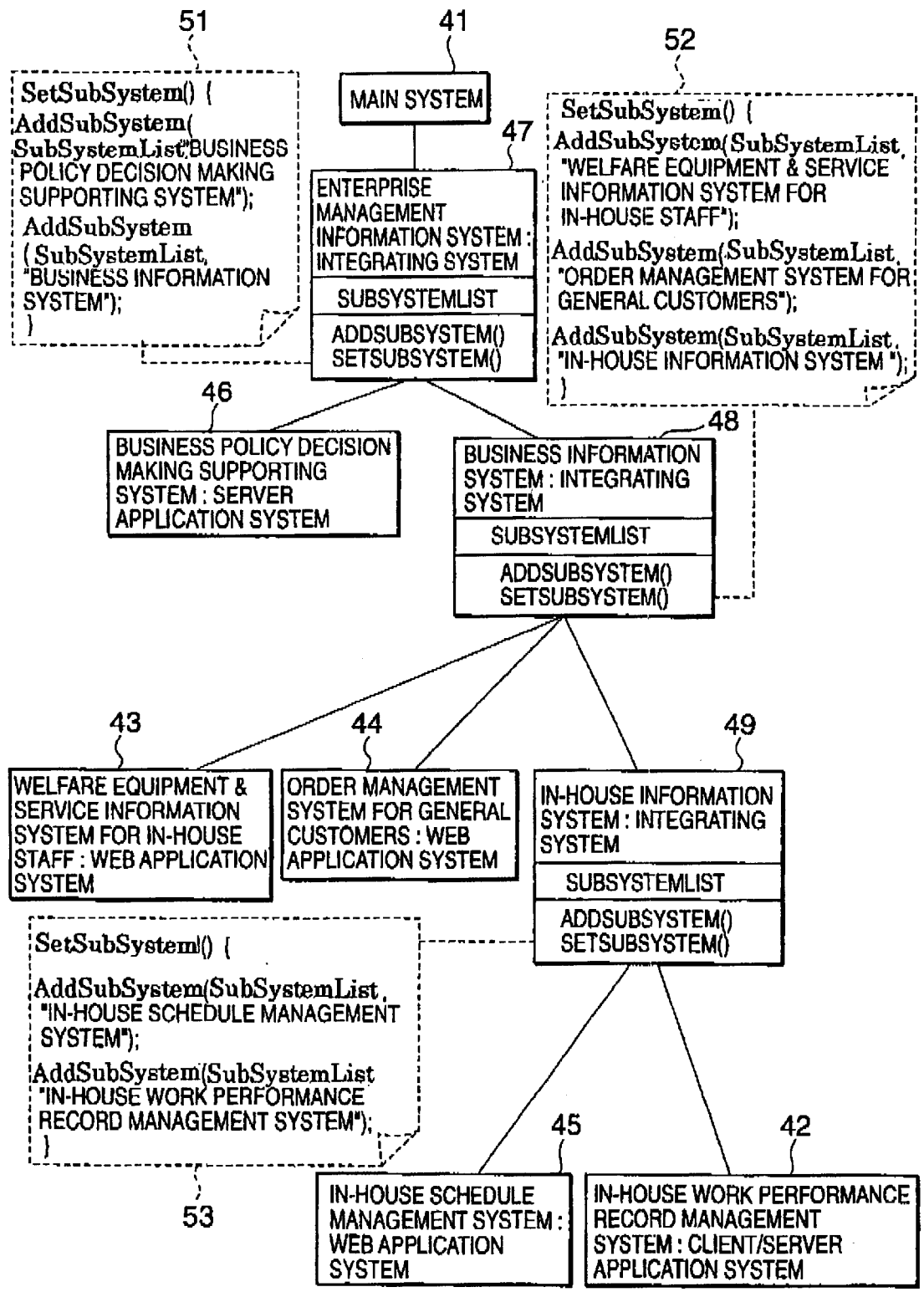
FIG. 16 is a block diagram for explaining an example of a hierarchical possession relationship (a tree structure) of an enterprise management information management system which is constructed by a preferred embodiment of the present invention.

Thereafter, the hierarchical possessive relation between the systems 41 through 49 thus prepared is constructed as a tree structure shown in FIG. 16 (step 104 of FIG. 2). The tree structure shown in FIG. 16 has the relationships wherein (1) the enterprise management information system 47 possesses the business policy decision making supporting system 46 and the business information system 48, (2) the business information system 48 possesses the welfare equipment & service information system for in-house staff 43, the order management system for general customers 44 and the in-house information system 49, and (3) the in-house information system 49 possesses the in-house schedule management system 45 and the in-house work performance record management system 42.

When the above described possessive relationship (1) is intended to be installed, the child system setting method of the enterprise management information system 47 is overridden, and it is set in a child system list that the enterprise management information system 47 possesses the business policy decision making supporting system 46 and the business information system 48(see reference number 51 in FIG. 16). Similarly, when the above described possessive relationship (2) is intended to be installed, the child system setting method of the business information system 48 is overridden, and it is set in the child system list that the business information system 48 possesses the welfare equipment & service information system for in-house staff 43, the order management system for general customers 44 and the in-house information system 49 (see reference number 52 in FIG. 16). Moreover, similarly, when the above described possessive relationship (3) is intended to be installed, the child system setting method of the in-house information system 49 is overridden, and it is set in the child system list that the in-house information system 49 possesses the in-house schedule management system 45 and the in-house work performance record management system 42 (see reference number 53 in FIG. 16).

Furthermore, while the hierarchical possessive relationship between the systems 41 through 49 has been thus defined, such a possessive relationship can be easily changed by changing the installed contents of the child system setting method included in the integrating system.

Figure 17:
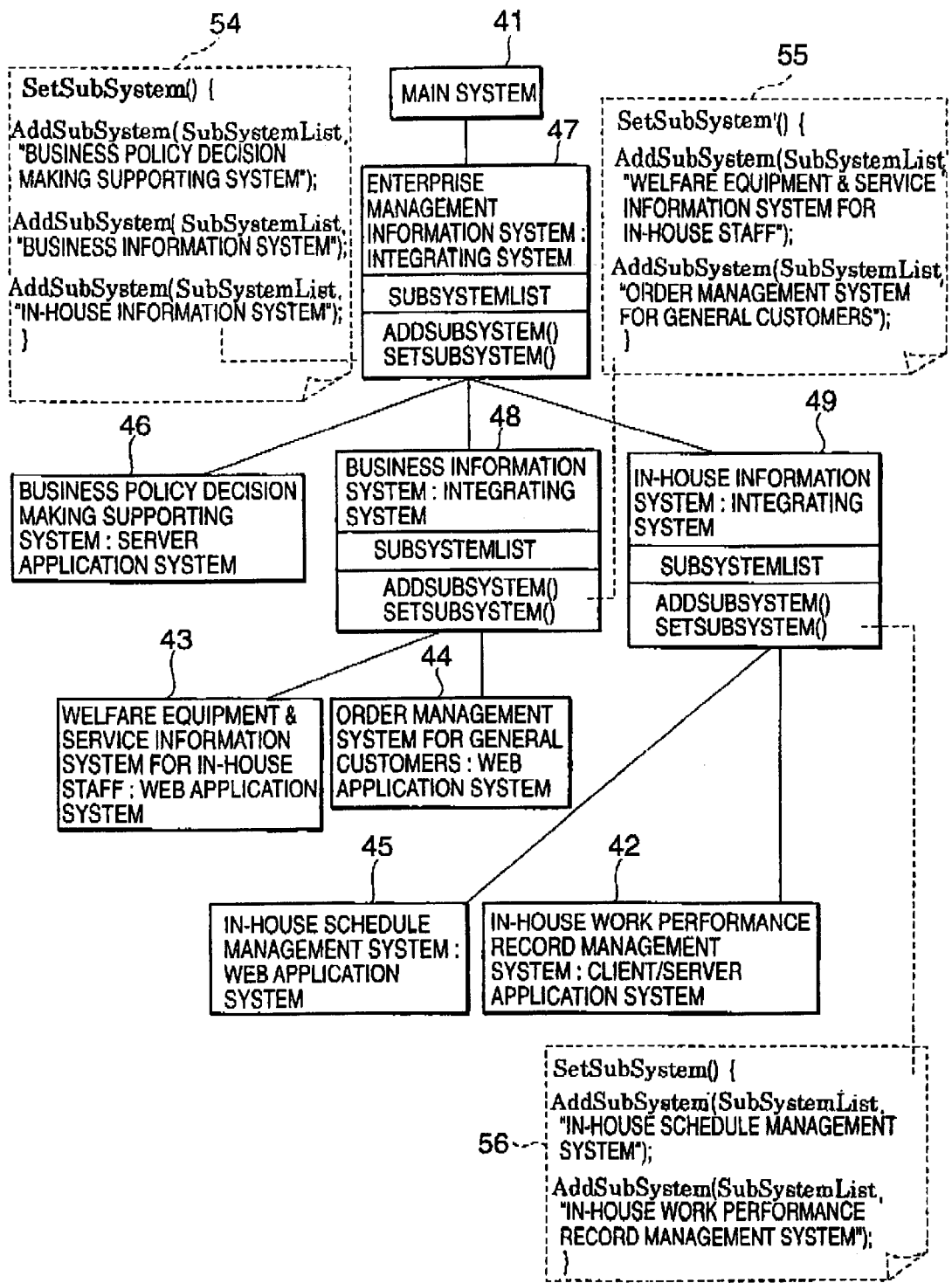
FIG. 17 is a block diagram for explaining a modified example of the tree structure of the enterprise management information management system shown in FIG. 16.

FIG. 17 is a block diagram showing a modified example of the tree structure of the enterprise system shown in FIG. 16. The tree structure shown in FIG. 17 has the relationships wherein (1') the enterprise management information system 47 possesses the business policy decision making supporting system 46, the business information system 48 and the in-house information system 49, (2') the business information system 48 possesses the welfare equipment & service information system for in-house staff 43 and the order management system for general customers 44, and (3') the in-house information system 49 possesses the in-house schedule management system 45 and the in-house work performance record management system 42.

When the above described possessive relationship (1') is intended to be installed, the child system setting method of the enterprise management information system 47 is overridden, and it is set in a child system list that the enterprise management information system 47 possesses the business policy decision making supporting system 46, the business information system 48 and the in-house information system 49 (see reference number 54 in FIG. 17). Similarly, when the above described possessive relationship (2') is intended to be installed, the child system setting method of the business information system 48 is overridden, and it is set in the child system list that the business information system 48 possesses the welfare equipment & service information system for in-house staff 43 and the order management system for general customers 44 (see reference number 55 in FIG. 17). Moreover, similarly, when the above described possessive relationship (3') is intended to be installed, the child system setting method of the in-house information system 49 is overridden, and it is set in the child system list that the in-house information system 49 possesses the in-house schedule management system 45 and the in-house work performance record management system 42 (see reference number 56 in FIG. 17).

Furthermore, when a system is changed, e.g., added or deleted, with respect to the constructed tree structure, it has only to change the child system setting method of an integrating system which is a parent of a system to be changed, so that there is no influence on other systems. For example, in order to change the tree structure shown in FIG. 16 to the tree structure shown in FIG. 17, it has only to change only the child system setting methods of the enterprise management information system 47 and business information system 48 which are integrating systems, so that it is not required to change other systems.

Finally, the systems 41 through 49 thus prepared are compiled and linked to be integrated as one enterprise management information management system (step 105 of FIG. 2).

[Operation of Enterprise Management Information Management System]

The operation of the enterprise management information management system thus constructed will be described below.

As shown in FIG. 15, the enterprise management information management system is prepared on the basis of the client/server application system framework 12, Web application system framework 13, server application system framework 14 and framework for integrating systems 15, which inherit the enterprise system basic framework 11 as a parent. Therefore, each of the systems thus prepared has a basic function provided with an integrated method name, and the same method can be integrally executed. In addition, the integrating system provides a mechanism for handling its child system, and any one of the integrating systems provides a basic function with the integrated method name, 60 that the relationship between the integrating system and the child system thereof can be handled integrally in the whole system. Thus, even in a case where a message is transmitted to the whole system, it is not required to transmit the message to each of the child systems, so that it is possible to propagate the message to all of the child systems of the integrating system by transmitting the message only to the integrating system.

Figure 18:
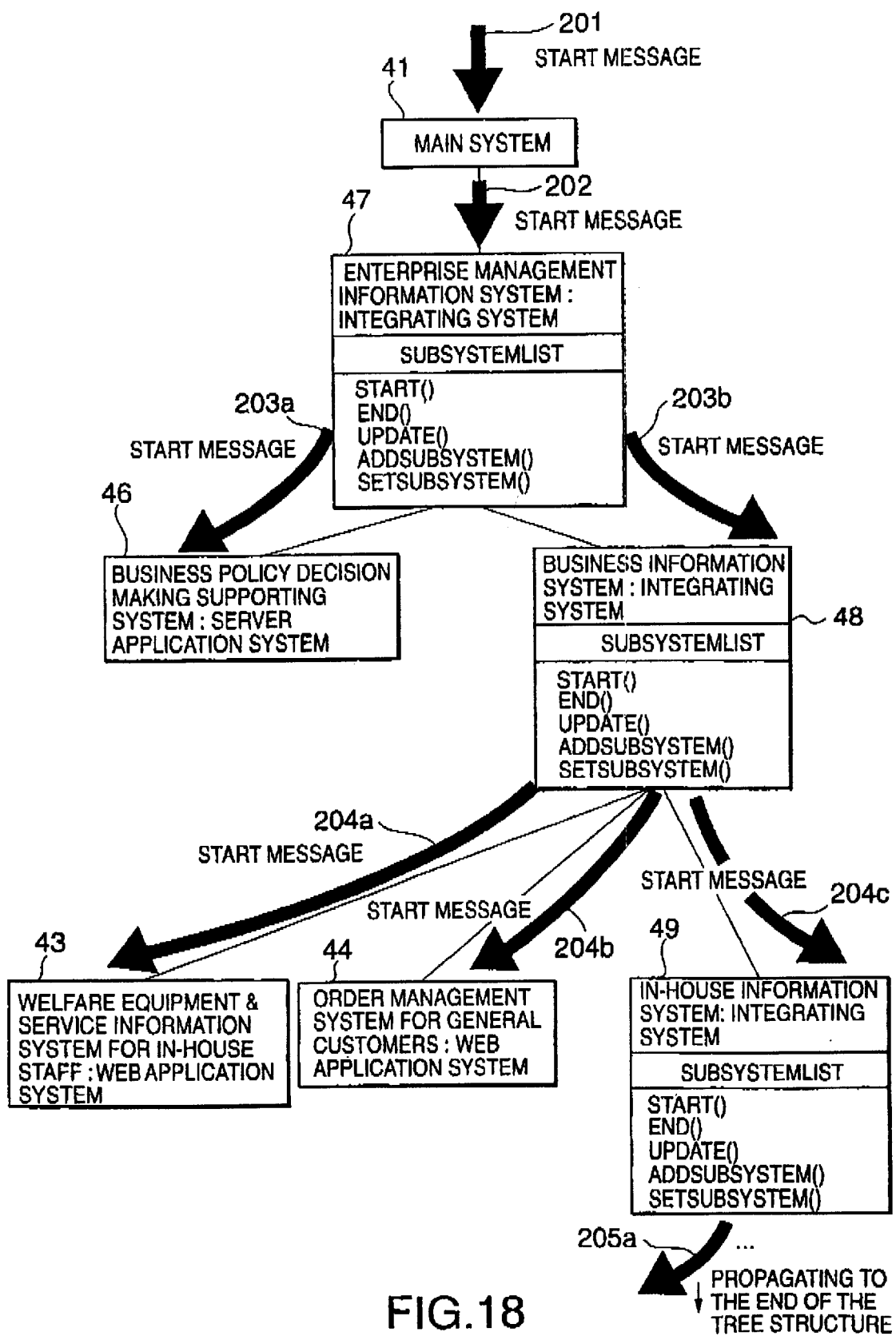
FIG. 18 is an illustration for explaining an operation when a start message is transmitted in the enterprise management information management system shown in FIG. 16.

FIG. 18 is an illustration for explaining operation when a start message for starting a system in the enterprise management information management system shown in FIG. 16 is transmitted to the whole tree structure.

In FIG. 18, if a start message is inputted to the main system 41 (step 201), the start message is transferred to the enterprise management information system 47 which is an integrating system (step 202).

At this time, in the enterprise management information system 47, the start method of the enterprise management information system 47 is executed by the transferred start message. The start method of each of the integrating systems is installed so as to transmit the start message to all of the systems registered in the child system list, and the start message from the main system 41 is transferred to the business policy decision making supporting system 46 and the business information system 48, respectively (steps 203a and 203b).

Similarly, in the business information system 48, the start method is executed by the transferred start message, and the start message is transferred to the welfare equipment & service information system for in-house staff 43, the order management system for general customers 44 and the in-house information system 49, respectively (steps 204a, 204b and 204c).

The start message is thus transferred to the end of the tree structure, so that the start message is propagated over the whole tree structure (step 205a and so forth).

Figure 19:
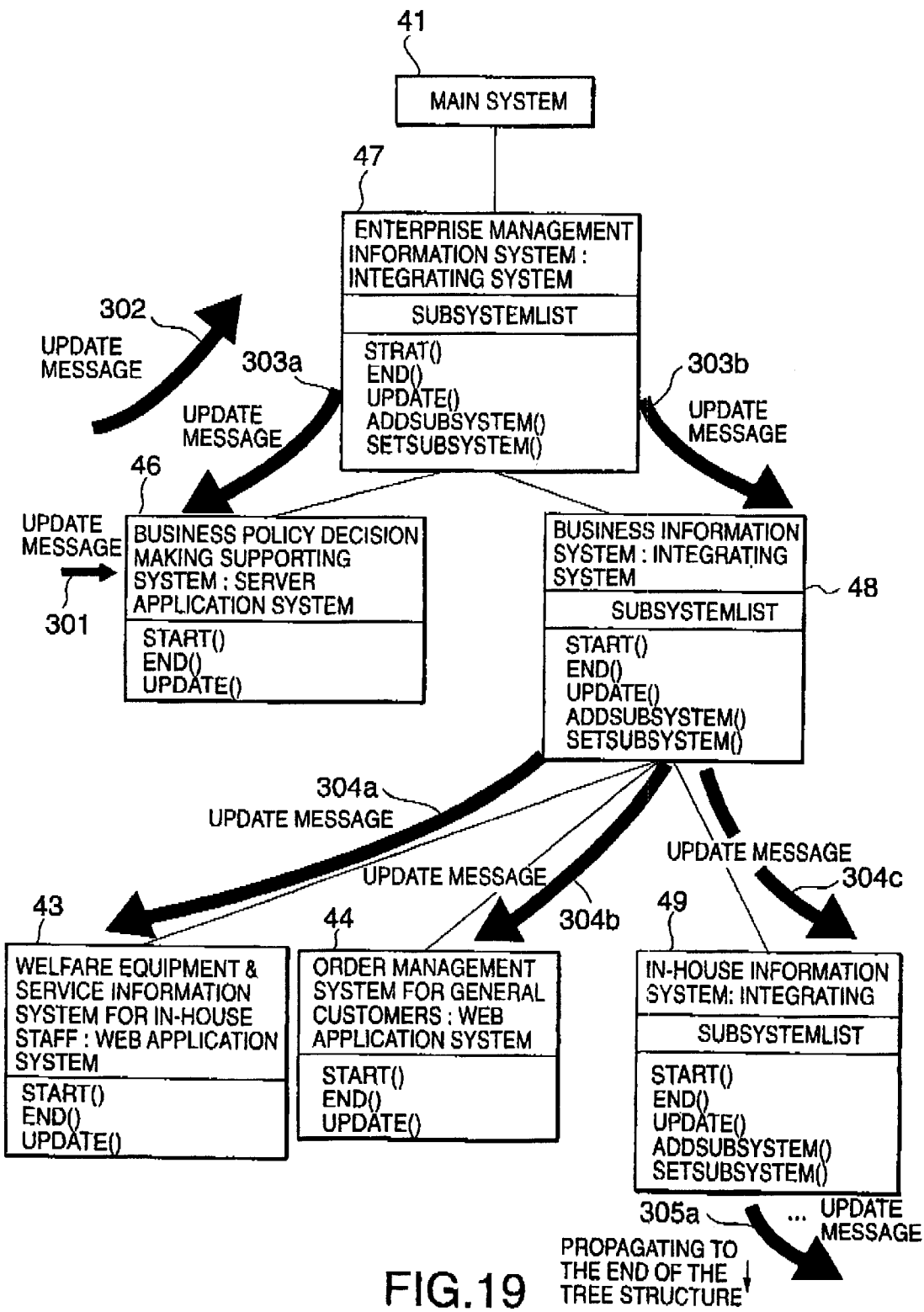
FIG. 19 is an illustration for explaining an operation when an update message is transmitted in the enterprise management information management system shown in FIG. 16.

FIG. 19 is an illustration for explaining operation when an update message for updating data in the enterprise management information management system shown in FIG. 16 is transmitted over the whole tree structure.

Furthermore, it is assumed that the update method of each of systems is installed as follows. That is:
(a) in the case of a system other than an integrating system,
  (i) if a message is received from the integrating system, its own update method is executed to update only its own data,
  (ii) if a message is received from the system other than the integrating system, an update message is transferred to its parent system;
(b) in the case of the integrating system, a message is transferred to all of the systems registered in the child system list.

In FIG. 19, if an update message is inputted to the business policy decision making supporting system 46 (step 301), the update method of the business policy decision making supporting system 46 is executed by the update message. In this case, the installed portion corresponding to the above-described (a) (ii) is executed by the update method, and the update message is transferred to the enterprise management information system 47 (step 302).

Then, in the enterprise management information system 47, the update method of the enterprise management information system 47 is executed by the transferred update message. In this case, the installed portion corresponding to the above described (b) is executed by the update method, and the update message is transferred to the business policy decision making supporting system 46 and the business information system 46, respectively (steps 303a and 303b).

In the business policy decision making supporting system 46, the installed portion of the update method of the enterprise management information system 47 corresponding to the above described (a) (i) is executed by the transferred update message, and data are updated.

On the other hand, in the business information system 48, the installed portion of the update method of the enterprise management information system 47 corresponding to the above described (b) is executed by the transferred update message, and the update message is transferred to the welfare equipment & service information system for in-house staff 43, the order management system for general customers 44 and the in-house information system 49, respectively (steps 304a, 304b and 304c).

The update message is thus transferred to the end of the tree structure, so that the update message is propagated over the whole tree structure (step 305a and so forth).

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An enterprise system constructing method for constructing an enterprise system using a framework which is described by an object-oriented language, said enterprise system constructing method comprising the steps of:

preparing an enterprise system framework, which include (a) an enterprise system basic frame work which defines a basic attribute and behavior of an enterprise system, (b) a client/server application system framework, an Web application system framework and a server application system framework, which inherit said enterprise system basic framework and which define a basic attribute and behavior of a stand-alone client/server application system, a network-oriented client/server application system and a server-oriented server application system, respectively, and (c) a framework for integrating systems, which inherits said enterprise system basic framework and which defines a basic attribute and behavior of a combination of said client/server application system framework, said Web application system framework and said server application system framework;

inheriting said client/server application system framework, said Web application system framework and said server application system framework of said enterprise system framework, respectively, to prepare a client/server application system, an Web application system and a server application system;

inheriting said framework for integrating systems of said enterprise system framework to prepare an integrating system;

inheriting said enterprise system basic framework of said enterprise system framework to prepare a main system;

utilizing said integrating system to construct a hierarchical possessive relationship between said client/server application system, said Web application system and said server application system; and integrating said client/server application system, said Web application system, said server application system, said integrating system and said main system.

2. An enterprise system constructing method as set forth in claim 1, wherein said enterprise system basic framework, said client/server application system framework, said Web application system framework, said server application system framework and said framework for integrating systems of said enterprise system framework are, respectively, prepared as a framework including an abstract class group which abstractly defines an attribute and behavior of a system and which has a hierarchical structure constructed by an inherit relationship.

3. An enterprise system constructing method as set forth in claim 1, wherein said enterprise system basic framework, said client/server application system framework, said Web application system framework, said server application system framework and said framework for integrating systems of said enterprise system framework are, respectively, prepared as a framework including a group of abstract classes, each of which abstractly defines an attribute and behavior of a system and which is formed so as to include an abstract method mixed with a concrete method.

4. An enterprise system constructing method as set forth in claim 1, wherein said hierarchical possessive relationship between said client/server application system, said Web application system and said server application system is constructed as a tree structure, the vertex of which is said integrating system.

5. An enterprise system constructing method as set forth in claim 1, wherein said client/server application system, said Web application system, said server application system, said integrating system and said main system are compiled and linked to be integrated.

6. An enterprise system constructing method as set forth in claim 1, wherein said client/server application system, said Web application system, said server application system, said integrating system and said main system are incorporated via a previously prepared inherent interface to be integrated.

7. A computer readable recording medium in which an enterprise system framework described by an object-oriented language is recorded, said enterprise system framework comprising:

an enterprise system basic framework which defines a basic attribute and behavior of an enterprise system;

a client/server application system framework which inherits said enterprise system basic framework and which defines a basic attribute and behavior of a stand-alone client/server application system;

a Web application system framework which inherits said enterprise system basic framework and which defines a basic attribute and behavior of a network-oriented client/server application system;

a server application system framework which inherits said enterprise system basic framework and which defines a basic attribute and behavior of a server-oriented server application system; and a framework for integrating systems which inherits said enterprise system basic framework and which defines a basic attribute and behavior of a combination of said client/server application system framework, said Web application system framework and said server application system framework, wherein said framework for integrating systems is formed so that a hierarchical possessive relationship between said client/server application system, said Web application system and said sever application system, which inherit said client/server application system framework, said Web application system framework and said server application system framework, respectively, is constructed as a tree structure, the vertex of which is an integrating system inheriting said framework for integrating systems.

8. A computer readable recording medium, in which an enterprise system framework including a group of frameworks, which are described by an object-oriented language and which are capable of constructing a hierarchical possessive relationship between systems generated by each of the frameworks, is recorded, said enterprise system framework comprising:

an enterprise system basic framework which defines a basic attribute and behavior of an enterprise system;

a group of frameworks for various executable environments, which inherit said enterprise system basic framework; and a framework for integrating systems which inherits said enterprise system basic framework and which defines a basic attribute and behavior of a combination of said group of frameworks for various executable environments, wherein said framework for integrating systems is formed so that a hierarchical possessive relationship between a group of systems, which inherit said group of frameworks for various executable environments, is constructed as a tree structure, the vertex of which is an integrating system inheriting said framework for integrating systems.

9. A system for supporting the construction of an enterprise system, using an enterprise system framework which is described by an object-oriented language, said enterprise system framework including (a) an enterprise system basic framework which defines a basic attribute and behavior of an enterprise system, (b) a client/server application system framework, an Web application system framework and a server application system framework, which inherit said enterprise system basic framework and which define a basic attribute and behavior of a stand-alone client/server application system, a network-oriented client/server application system and a server-oriented server application system, respectively, and (c) a framework for integrating systems, which inherits said enterprise system basic framework and which defines a basic attribute and behavior of a combination of said client/server application system framework, said Web application system framework and said server application system framework, said system for supporting the construction of an enterprise system comprising:

means for inheriting said client/server application system framework, said Web application system framework, said server application system framework and said framework for integrating systems of said enterprise system framework, respectively, to prepare a client/server application system, an Web application system, a server application system and an integrating system, and for inheriting said enterprise system basic framework of said enterprise system framework to prepare a main system;

means for utilizing the prepared integrating system to define a hierarchical possessive relationship between said client/server application system, said Web application system and said server application system; and means for integrating said client/server application system, said Web application system, said server application system, said integrating system and said main system.

10. A system for supporting the construction of an enterprise system as set forth in claim 9, further comprising means for carrying out processing, such as retrieval, editing, registration or deletion, with respect to said enterprise system framework.

11. A computer readable recording medium, in which a program for supporting the construction of an enterprise system, using a framework which is described by an object-oriented language, is recorded, said computer readable recording medium causing a computer to execute procedures for:

preparing an enterprise system framework, which include
(a) an enterprise system basic framework which defines a basic attribute and behavior of an enterprise system,
(b) a client/server application system framework, an Web application system framework and a server application system framework, which inherit said enterprise system basic framework and which define a basic attribute and behavior of a stand-alone client/server application system, a network-oriented client/server application system and a server-oriented server application system, respectively, and (c) a framework for integrating systems, which inherits said enterprise system basic framework and which defines a basic attribute and behavior of a combination of said client/server application system framework, said Web application system framework and said server application system framework;

inheriting said client/server application system framework, said Web application system framework, said server application system framework and said framework for integrating systems of said enterprise system framework, respectively, to prepare a client/server application system, an Web application system, a server application system and an integrating system, and inheriting said enterprise system basic framework to prepare a main system;

utilizing said integrating system to define a hierarchical possessive relationship between said client/server application system, said Web application system and said server application system; and integrating the defined client/server application system, Web application system, server application system, integrating system and main system.

* * * * *

UNITED STATES PATENT AND TRADEMARK OFFICE
CERTIFICATE OF CORRECTION

PATENT NO. : 6,684,383 B1
DATED : January 27, 2004
INVENTOR(S) : Natori et al.

It is certified that error appears in the above-identified patent and that said Letters Patent is hereby corrected as shown below:

Column 28,
Line 31, change "frame work" to -- framework --.
Lines 34 and 51, change "an Web" to -- a Web --.

Column 29,
Line 36, change "medium" to -- medium, --.
Line 55, change "systems" to -- systems, --.

Column 30,
Line 16, change "systems" to -- systems, --.
Lines 35 and 53, change "an Web" to -- a Web --.

Column 31,
Lines 13-14, change "an Web" to -- a Web --.

Column 32,
Line 10, change "an Web" to -- a Web --.

Signed and Sealed this

First Day of June, 2004

JON W. DUDAS
*Acting Director of the United States Patent and Trademark Office*